US 7,225,414 B1

(12) United States Patent
Sharma et al.

(10) Patent No.: US 7,225,414 B1
(45) Date of Patent: May 29, 2007

(54) METHOD AND SYSTEM FOR VIRTUAL TOUCH ENTERTAINMENT

(75) Inventors: Rajeev Sharma, State College, PA (US); Emilio Schapira, State College, PA (US); Namsoon Jung, Boalsburg, PA (US)

(73) Assignee: VideoMining Corporation, State College, PA (US)

( * ) Notice: Subject to any disclaimer, the term of this patent is extended or adjusted under 35 U.S.C. 154(b) by 855 days.

(21) Appl. No.: 10/634,962

(22) Filed: Aug. 5, 2003

Related U.S. Application Data

(60) Provisional application No. 60/409,435, filed on Sep. 10, 2002.

(51) Int. Cl.
G06F 3/00 (2006.01)
G06F 9/00 (2006.01)
(52) U.S. Cl. ...................... 715/863; 715/862
(58) Field of Classification Search ................ 715/863
See application file for complete search history.

(56) References Cited

U.S. PATENT DOCUMENTS

| | | | |
|---|---|---|---|
| 5,423,554 A | 6/1995 | Davis | |
| 5,534,917 A | 7/1996 | MacDougall | |
| 5,601,487 A | 2/1997 | Oshima et al. | |
| 5,790,124 A * | 8/1998 | Fischer et al. | 345/629 |
| 6,086,380 A | 7/2000 | Chu et al. | |
| 6,222,465 B1 * | 4/2001 | Kumar et al. | 341/20 |
| 6,386,985 B1 | 5/2002 | Rackham | |

OTHER PUBLICATIONS

U.S. Appl. No. 60/369,279, filed Apr. 2, 2002, Sharma et al.
U.S. Appl. No. 60/394,324, filed Jul. 8, 2002, Sharma et al.
U.S. Appl. No. 60/399,246, filed Jul. 29, 2002, Sharma et al.
U.S. Appl. No. 60/402,817, filed Aug. 12, 2002, Sharma et al.
Bolt R.A.,SIGGRAPH-Computer Graphics, 1980.
Krahnstoever N.,et al, Dept. of Comp. Science, Technical Rep CSE-02-010, Penn State Univ.
Oviatt S L., et al., International Conference on Spoken Language Processing, Philadelphia, 1996.
Poddar I., et al., Proc. 2nd Workshop on Perceptual User Interface, 1998, pp. 1-6.
Sharma R., et al., Proc of the IEEE (Multimedia Computing Comm) 86(5):853-869, May 1998.
Yang M H, et al., IEEE Trans. on Pattern Analysis and Machine Intelligence, 2001.
Yeasin M, et al., Proc. IEEE Conf. on Comp. Vision and Pattern Recognition, vol. 2, p. 168-173 2000.
Young S.J.,et al.,Cambridge University Engineering Dept, CUED/F-INFENG/TR38, 1989.

* cited by examiner

*Primary Examiner*—Weilun Lo
*Assistant Examiner*—Shashi Becker

(57) ABSTRACT

The present invention is a method and apparatus for attracting the attention of people in public places and engaging them in a touch-free interaction with a multimedia display using an image-capturing system and a set of Computer Vision algorithms as a means of informing the public as well as collecting data about/from the users. The invention is named, Virtual Touch Entertainment (VTE) Platform. The VTE Platform comprises of a series of interaction states, such as the Wait State, the Attraction State, the User Engagement State, the User Interaction State, and the Interaction Termination State. The modules in these interaction states handle complicated tasks assigned to them, such as attracting the users, training the users, providing the multimedia digital content to the users, and collecting the user data and statistics, in an efficient and intelligent manner. The user is able to experience a whole new way of interaction paradigm while getting information and entertainment through the rich digital multimedia. The system operates automatically and dynamically in real-time throughout the whole interaction process.

24 Claims, 21 Drawing Sheets

METHOD AND SYSTEM FOR VIRTUAL TOUCH ENTERTAINMENT

CROSS-REFERENCE TO RELATED APPLICATIONS

Figure 1:
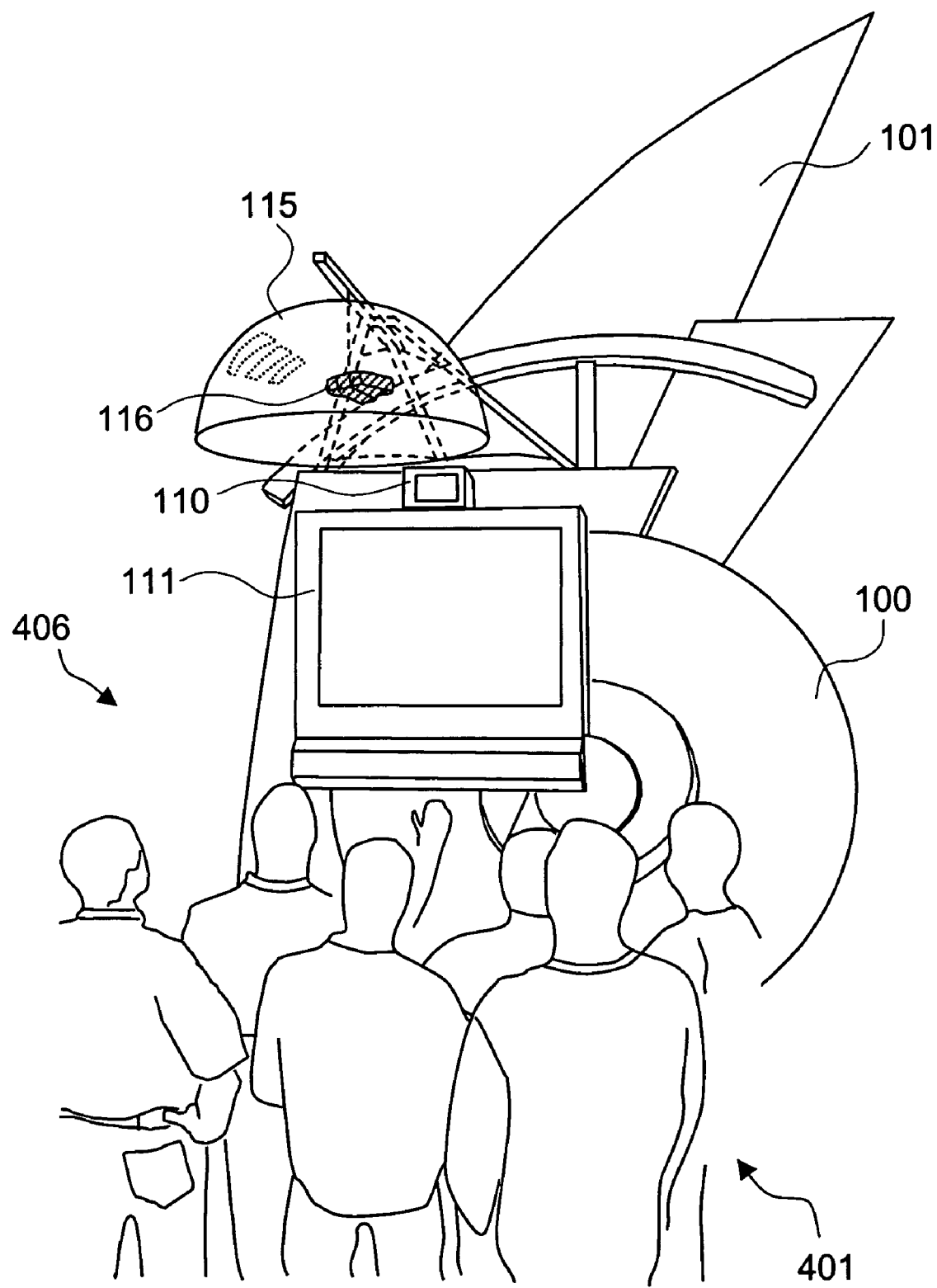

This application is entitled to the benefit of Provisional Patent Application Ser. No. 60/409,435, filed Sep. 10, 2002.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and apparatus for attracting the attention of people in public places and engaging them in a touch-free interaction with a multimedia display using an image-capturing system and a set of Computer Vision algorithms as a means of informing the public (useful for advertising) as well as collecting data about/from the users.

2. Background of the Invention

In the digital generation, people require a new paradigm for getting information and entertainment, especially in a public place. With the overflow of information, such as the flood of emails, the new paradigm should be able to provide an outstanding and unique experience to the user in order to attract them to the information efficiently. The invention, disclosed in this document, is named, Virtual Touch Entertainment (VTE) Platform. The VTE Platform is a system, which not only informs the public with a whole new way of interaction but also creates an entertaining virtual experience with the rich multimedia content. While it enhances the user interaction, the VTE Platform is also able to measure the user experiences providing an information database about the users to the owner of the particular embodiment of the VTE Platform. Some of the key terms in the VTE Platform are "Public Engagement", "Touch-Free Interface", "Interactive System", and "Infotainment Platform".

The VTE Platform is primarily targeted for public engagement. In a particular standalone embodiment, which will be shown later in this document, the VTE Platform is hard to miss in the public place, such as the exposition, at nearly 10 feet tall with a rich multimedia display. The embedded VTE Platform, as another form of the embodiment of the invention, can also be used seamlessly in any public place without the obtrusive structure to the pre-exiting setup, yet adapting to the new paradigm of the interaction and infotainment provision. The Touch-free Interface is another strong feature what makes the VTE Platform unique because it provides a new paradigm of user interaction and creates an exciting experience to the user.

In the VTE Platform, the users are able to experience interactive and creative digital multimedia Infotainment. The "Infotainment" is the composite word of "information" and "entertainment". In other words, the VTE Platform is an interactive digital multimedia management system, which provides such a creative infotainment experience to the user. Rich digital images, delivered through high quality displays, and audio, emitted through a sound system, can have any creative content in the VTE Platform. If the VTE Platform is connected to the network, the Internet connectivity enables the accurate and timely delivery of new rich multimedia content and information update.

Advertisement is one good exemplary domain, where the VTE Platform can be applied successfully. The VTE Platform provides an unsurpassed opportunity for the owner of a specific system to create a personalized interaction with the customers. The user of the VTE Platform could become the model in the advertising content, using the Computer Vision based technologies, such as face detection and superimposition, strongly imprinting the owner's brand in the user's mind. The interactivity with the VTE Platform by Touch-free interaction technology based on the body movements can further increase the advertisement effect.

Education is another exemplary domain where the VTE Platform can be applied successfully. With a slight variation for this specific context, the VTE Platform can become an entertaining educational tool for kids, and this can be termed as "edu-tainment" VTE Platform for kids.

The VTE Platform not only creates the infotainment experience to the user, but also gathers data about the users in the view of the image-capturing system. The data gathering services utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. These services include detection of customers, their classification into segments based on demographics, and the capture of information about their interaction with the VTE Platform. The exemplary statistics gathered by the VTE Platform can include;

- the total number of people who entered the capture zone in a give time period;
- the total number of people who actually interacted with the system (or entered the "hot spot");
- the division of people in demographic groups, including gender, race, broad age group;
- the traffic measurement, such as traffic composition by time of day, day of week, and demographic shifts; and
- the customer behavior, such as the time spent in the queue, in the store, at a display or whether the purchases are made or not.

This data collection in the VTE Platform enables immediate feedback of marketing initiatives, better understanding of customer behavior, and automated means of measurement. Retailers are constantly seeking to unlock the secrets to customer behavior, captivating them with meaningful communications in order to convert them into buyers of products and services. The data collection based on the computer vision technologies in the VTE Platform can provide the solutions for this business needs to make informed business decisions.

SUMMARY

The VTE Platform can be summarized with 3 different points of views, such as the user-interaction state point of view, the module processing point of view, and the technological processing point of view.

First, from the user-interaction state point of view, VTE Platform is a method and apparatus for making transitions in a user-interaction state loop, whose states consist of the Wait State, the Attraction State, the User Engagement State, the User Interaction State, and the Interaction Termination State. Each state consists of one or multiple modules. Modules are defined as an application, which can run standalone by itself, or a collection of applications, which are container of the sub-applications and also which can manage the execution of the individual sub-applications, in the VTE Platform. Not all the states have the same degree of importance. For example, different state could have different number of sub-modules. Some states could be regarded as optional states and implemented as implicit states. For example, the Interaction Termination State does not have to have an explicit implementation of modules but implicitly implemented.

Second, from the module processing point of view, VTE Platform is a method and apparatus for making transitions in a loop, which consists of modules, such as the Module Intro, the Module Attractor, the Module Training, the Module Selection, and the Module Exit. Each module could consist of sub-modules. For example, in the particular exemplary embodiment of the VTE Platform shown in FIG. 9, the Module Selection consists of 9 sub-modules grouped into 3 different areas, such as the Main Selection Area, the Information Selection Area, and the Entertainment Selection Area.

The design and functionality of the modules widely depend on the particular embodiment of the VTE Platform, as long as the embodiment satisfies the characteristics of the VTE Platform, which is to attract the attention of people in public places and to engage them in a Touch-free interaction with a multimedia display using an image-capturing system and a set of Computer Vision algorithms as a means of providing infotainment as well as collecting data about the users.

The specific usage or goal of the VTE Platform can also be widely dependent on the particular embodiment of the VTE Platform and the owner of the embodiment. For example, the VTE Platform can be used to advertise, to sell products on site, to do auction, to provide information to the public, to give entertaining experience to the user with a new paradigm of interaction, to educate children, to do video conferencing, to control an emergency situation, or even to give physical exercise as a virtual realty exercise platform.

The data collection about the users of the VTE Platform can be done both in an active way and in a passive way. For an active data collection, the VTE Platform can use a voluntary survey form and ask specific questions to the user. For a passive data collection, the VTE Platform can use a set of Computer Vision algorithms as mentioned earlier, such as face detection and face recognition.

Although they do not have to match necessarily and they are not the same exactly, the Module Intro loosely and similarly corresponds to the Wait State of the user-interaction state loop. Likewise, the Module Attractor to the Attraction State, the Module Training to the User Engagement State, the Module Selection to the User Interaction State, and the Module Exit to the Interaction Termination State. However, it should be emphasized that their relationship is not a one-to-one match. The details of relationship between the states and the modules will be described later in this document.

Third, from the technological processing point of view, VTE Platform is a method and apparatus for making transitions within a set of integrated technologies, which consists of the capturing continuous input images, face detection on these continuous input images, face tracking, hand detection, hand tracking, human voice signal capturing, speech recognition, displaying graphics on the display system, playing video, and playing sound.

The image-capturing system in the VTE Platform can be either dynamic or static. In the VTE Platform, the dynamic image-capturing system is defined to have capability to dynamically adjust all the conventional image-capturing system functionalities, such as pan, tilt, zoom, focus, auto-exposure, and white balance, and the application of the VTE Platform should be able to control the image-capturing system with these capabilities according to the specific application needs whereas the static image-capturing system has limited capability. In the VTE Platform, such a dynamic image-capturing technology or active sensing technology is called the DAS (Digital interActive Sensing) technology.

The active sensing technology automatically adjusts the angle of the pan and the angle of the tilt of the image-capturing system, depending on the user position and height, relative to the position and height of the VTE Platform. Since different people have different height and preference of standing position in front of the VTE Platform, the angles of the image-capturing system may have be adjusted every time when a new user appears.

The field of view from the image-capturing system may be divided into 3 different imaginary capture zones and 1 imaginary hot spot. The zones are called the user zone, the watcher zone, and the passers-by zone. The boundary of the zones can be flexibly adjusted depending on the specific application. Although this is not always true, usually, the watcher zone is the superset of the user zone, and the passers-by zone is the superset of the watcher zone and the user zone. There could be also multiple user zones, watcher zones, and passers-by zones. The Hot Spot is a conceptual place on the ground in front of the VTE Platform, where the VTE Platform can sense the person as a user for sure. The Hot-Spot is usually in the center of the user zone. It is an imaginary position, but it can also be physically marked, using any noticeable signs, devices, or structures, to help the user to know where to stand.

The entire field of view of the image-capturing system is usually the passers-by zone. Within this passers-by zone, the VTE Platform observes the crowd traffic and tries to sense and attract the people who pass nearby the VTE Platform. When there are no people nearby the VTE Platform or within the field of view of the image-capturing system, it stays in the default Wait State.

Face detection in Computer Vision may be used as a method to sense a person or multiple people appeared in front of the system. For the face detection, any robust, reliable, and efficient face detection method can be used. In the exemplary embodiment of the invention, a neural network based face detector or SVM based face detection method may be used. M. Yeasin, and Y. Kuniyoshi, Detecting and Tracking Human Face and Eye Using Space-Varying Sensor and an Active Vision Head, In Proceedings of IEEE Conference on Computer Vision and Pattern Recognition, Volume 2, Pages 168-173, 2000 explains about the neural network based face detector in more details.

After the faces are detected, the VTE Platform begins the face tracking and hand tracking of the people. Although, the exemplary human sensing method by the neural network face detector is reliable, it generally requires significant amount of processing time in actual embodiment of the algorithm. In order to make the VTE Platform system to work in real time, efficient use of tracking may be used in cooperation with the face detection, so that the face-tracking step, which uses much less processing time, takes over the face image processing task right after the initial face is detected. This enables the system to do the entire region face detection only at the beginning of the user interaction. After the initial global face detection, face-tracking process provides the information about the user's face image position and size. The tracking method can be any reasonably reliable and efficient face tracking method, such as the skin-color based method, Viterbi-algorithm based method, or any real-time face-tracking algorithm.

If there are people within the watcher zone and outside the user zone for a certain duration of time, and the face(s) of the people is (are) detected, the VTE Platform senses them and tries to encourage the person or people to interact with the system. However, since there is no person within the user zone, the VTE Platform also knows that there is no user who actually wants to interact with the system, and the VTE Platform does not start the actual interaction stages yet. This state is called the Attraction State, and in this state the VTE Platform only tries to attract the people and encourage a person to interact with the system. Through the coordinate of the face tracking, the VTE Platform knows in which zone the person is currently.

When a person among the people in the watcher zone steps into the user zone, the coordinate of the face tracking belongs to the inside the user zone boundary, and the person is said to be promoted from a watcher to a user, and the VTE Platform changes its current execution state from the Attraction State to the User Engagement State and consequent modules, such as the Module Training, begin execution. The Module Training introduces the user how to use the system, especially how to do the Touch-free interaction. This is an important module to those who do not know how to use the system. However, the Module Training is an optional module because the user might be a returning user, who already knows how to use the system and wants to go into the main content directly without spending time in the training process.

The VTE Platform can use multi-modality as described in R. Sharma, V. I., Pavlovic, and T. S. Huang, Toward Multimodal Human-Computer Interface, Proceedings of the IEEE (Special issue on Multimedia Computing and Communication) 86(5): 853-869, May 1998, for the user interaction and input paradigm. The main visual interaction modality in the VTE Platform is the Touch-free interaction. Unlike with previous gesture recognition systems, the Touch-free Interface is able to track the natural gestures. In the R. Sharma, N. Krahnstoever, and E. Schapira, "Method and System for Detecting Conscious Hand Movement Patterns and Computer-generated Visual Feedback for Facilitating Human-computer Interaction", U.S. Provisional Patent 60/369,279, Apr. 2, 2002, the authors describe a method and system for Touch-free user interaction in details.

The algorithms for head tracking is based on a rectangular tracking window whose location is continuously adapted using Kalman filters to follow the users head. The head tracker relies solely on skin color image cues, as explained in detail by N. Krahnstoever, S. Kettebekov, M. Yeasin, and R. Sharma, "iMap: A Real-Time Framework for Natural Multimodal Interaction with Large Screen Displays," Dept. of Comp. Science and Eng. Technical Report CSE-02-010, Pennsylvania State University, May 2002, and optimized to track skin colored moving objects. The tracking methods used are based on simple imaging cues but an extremely efficient and require less than 15% processing time of a single CPU.

The speech recognition can be started also as one of the input modalities for the interaction depending on the specific application needs. The speech recognition modality still enables the user to control the system without touching the system physically. A microphone can be used as an optional device for the speech recognition of the voice input from the user.

Fusion of audio and visual cues is a difficult problem by nature. Humans routinely perform complex and simple tasks in which ambiguous auditory and visual data are combined in order to support accurate perception. By contrast, automated approaches for processing multi-modal data sources lag far behind. This is primarily due to the fact that few methods adequately model the complexity of the audio/visual relationship. The synergistic integration principle supported by the synchronization of the multi-modal information streams on temporal coherence principles can provide a solution for this problem. The probabilistic approach for fusion of multiple modalities can also be applied.

The execution between capture zones does not have to follow the order mentioned above always, such as the watcher zone first, then the user zone next. Sometimes, the person directly steps into the user zone, and it could happen very quickly without giving any needs for the VTE Platform to process modules intended for the watcher zone. In this case, the VTE Platform can make a transition immediately to the User Engagement State and the following User Interaction State.

After the Module Training, the VTE Platform executes the Module Selection. The Module Selection is the main state where the user navigates through and gets the useful information or exciting experience through the contents provided.

When the person steps out of the user zone, it is said to be demoted, and the person becomes from a user to a watcher. From the Computer Vision point of view, this happens when the coordinate of the face tracking goes out of the user zone boundary and remains in the watcher zone boundary.

In order to give the user a certain degree of the freedom of movement, the boundary of the zones between the user zone and watcher zone can be loosely defined, and a time-out scheme can be applied to decide whether the person really stepped out of the user zone or not. For example, a person might not exactly stand in the middle of the user zone, but a little bit on one side of the user zone, yet still wants to interact with the system. As long as the user does not step out of the user zone totally, the person might still be able to interact with the system as a user. If the user steps out of the frame view totally, then the user is regarded left from the VTE Platform, and the system goes back into the default Wait State.

At the end of the interaction, the user can select the optional Module Exit at the Interaction Termination State. The Module Exit gathers useful information from the user by using the surveys and stores the information in a database. The Module Exit is one of the optional modules because some users might just want to leave from the VTE Platform as soon as the interaction terminated. If the user leaves the VTE Platform, the face tracking is terminated and regardless of the fact that the user chose the Module Exit or not, the VTE Platform goes back to the default state, which is the Module Intro, and the VTE Platform restarts the face detection for a new user within its field of view.

A speaker can be used for playing the audio content, attracting the user to the system, announcing important message, giving the instructions and audio feedback to the user, so as to aid the user to continue a meaningful interaction. Audio feedback can be as simple as sound effects that confirm the successful capture of a user's commands (e.g., a selection noise when a button was selected) or in the form of pre-recorded speech from a narrator or text to speech synthesis. The sound dome helps to localize the sound from the speaker of the sound dome, so that the user might hear well in a crowded environment.

DRAWINGS—FIGURES

Figure 2:
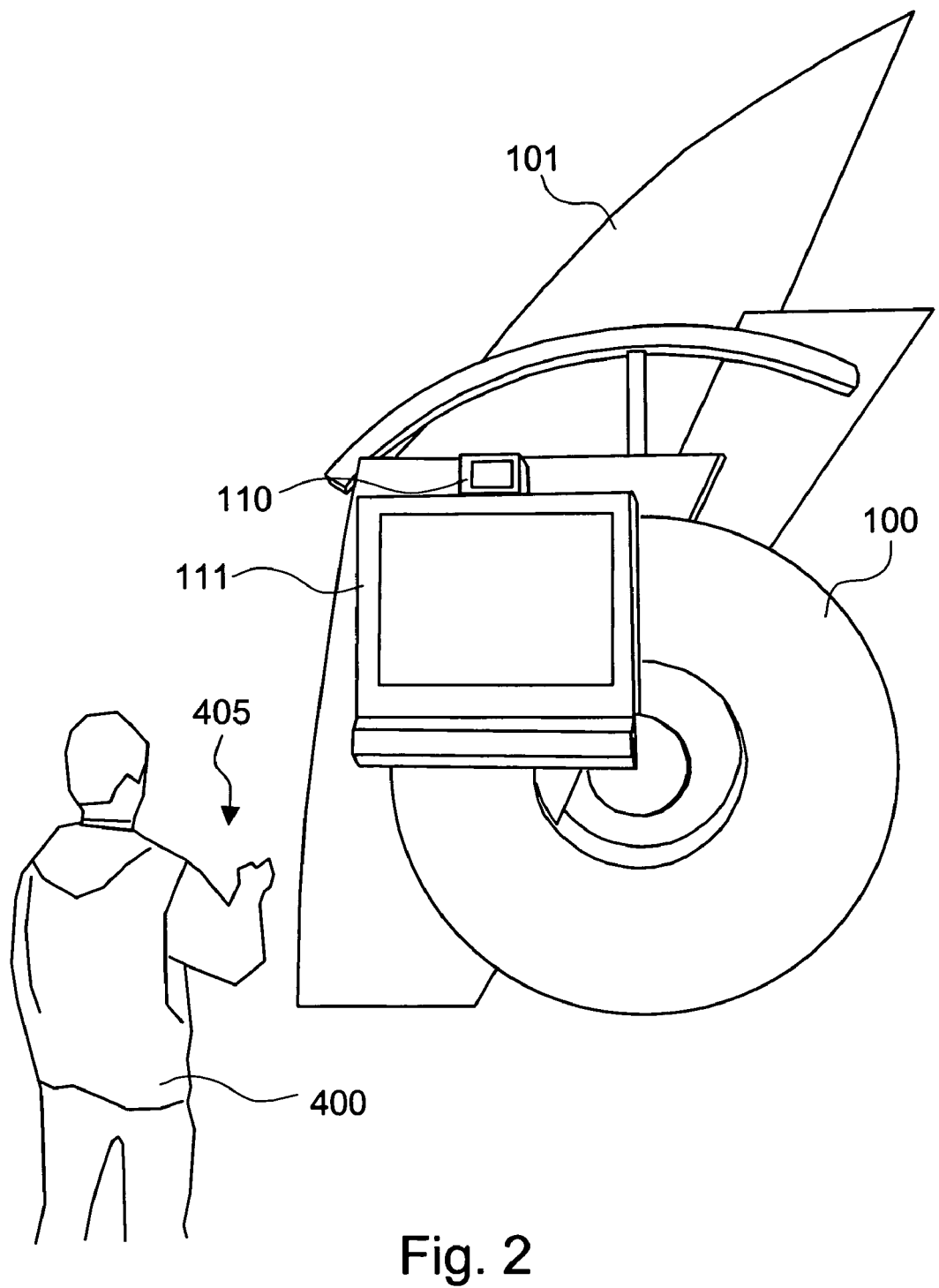
Figure 3:
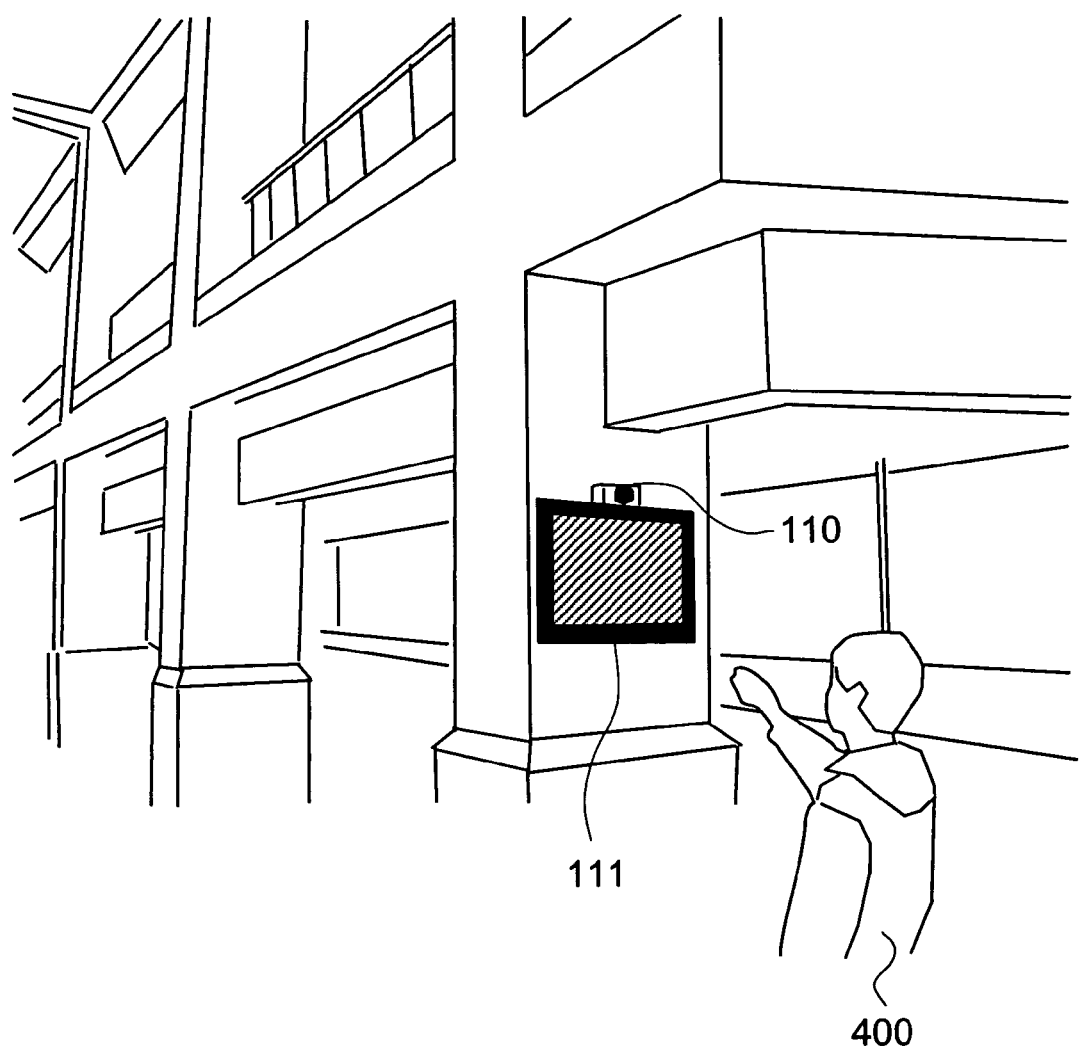
Figure 4:
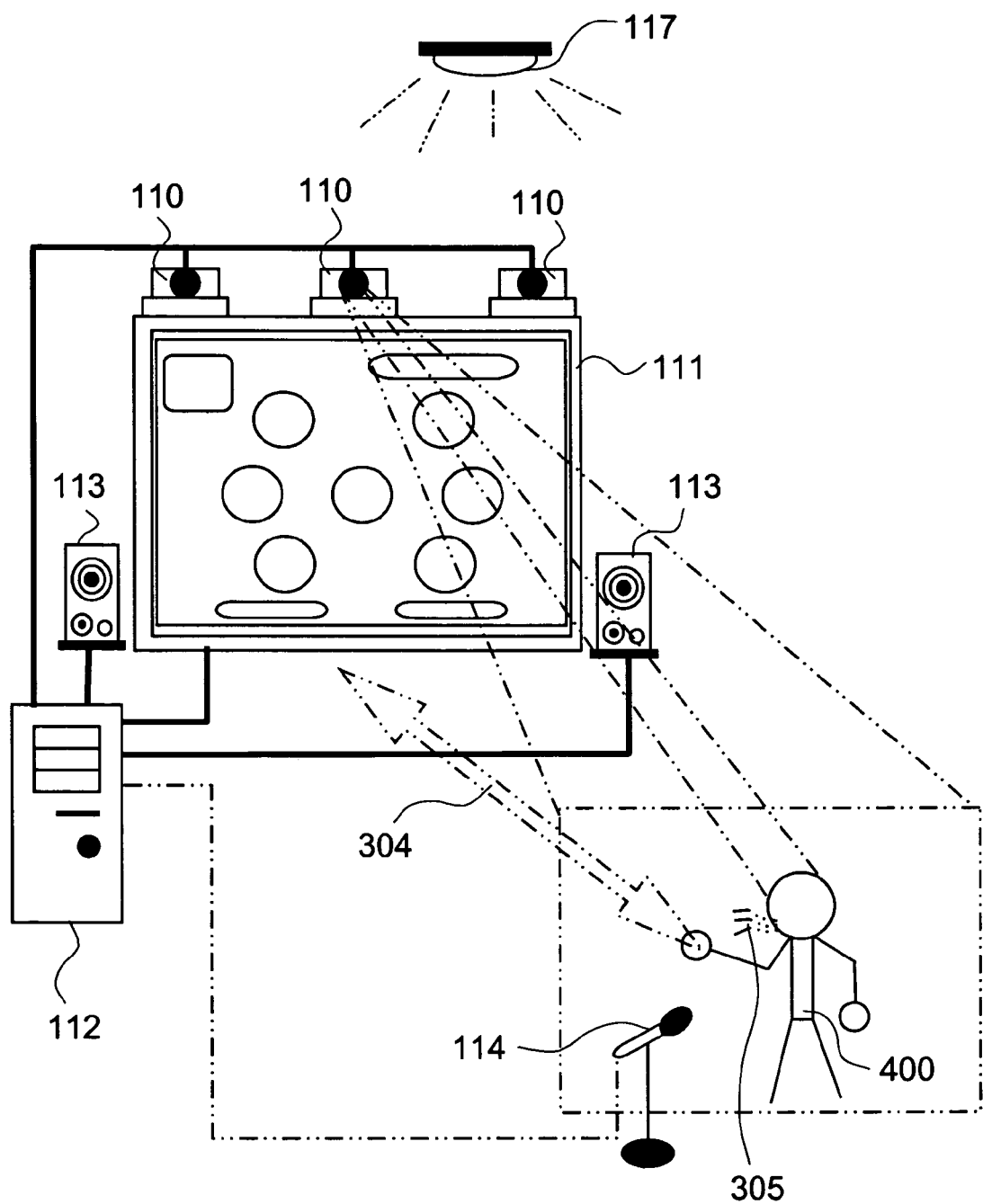
Figure 5:
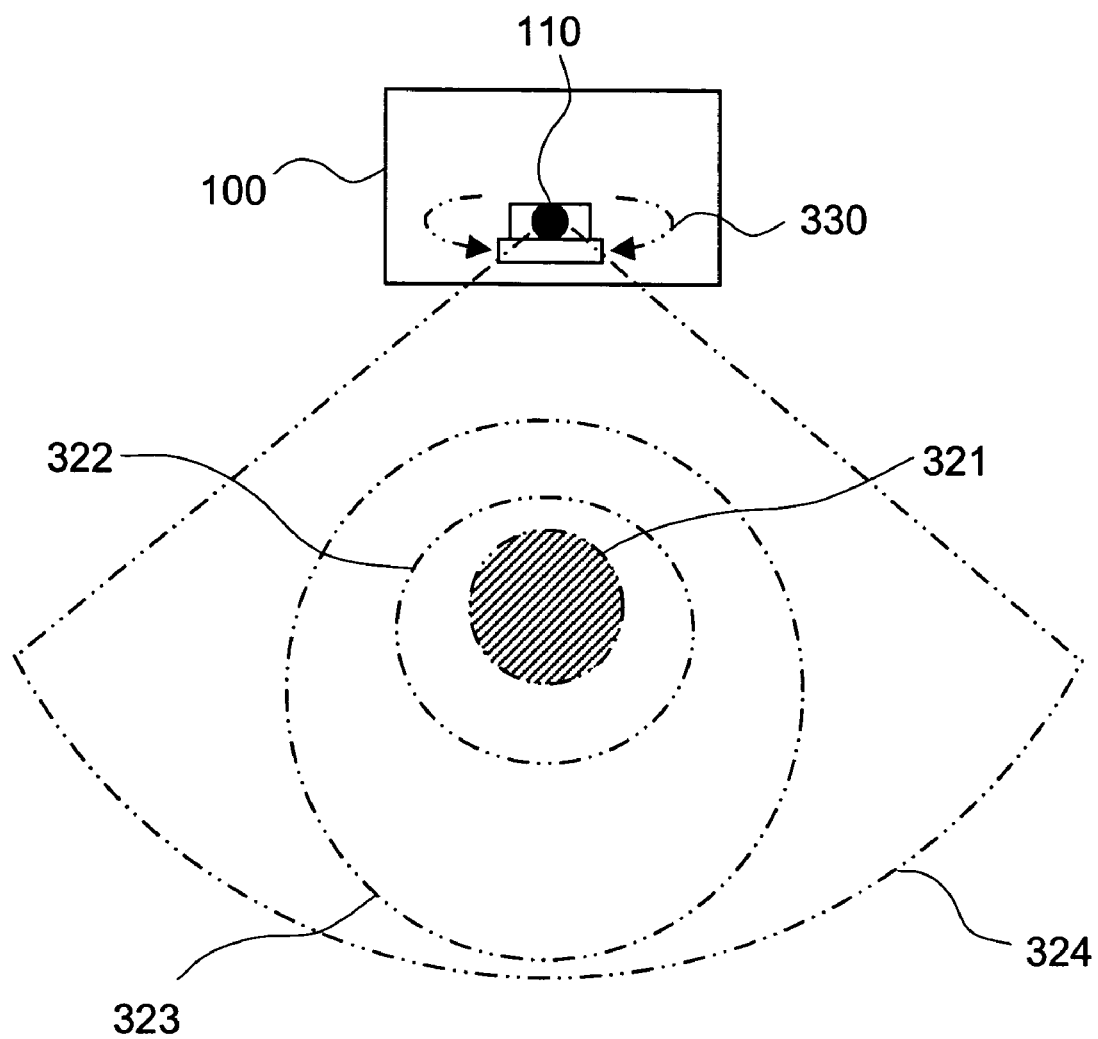
Figure 6:
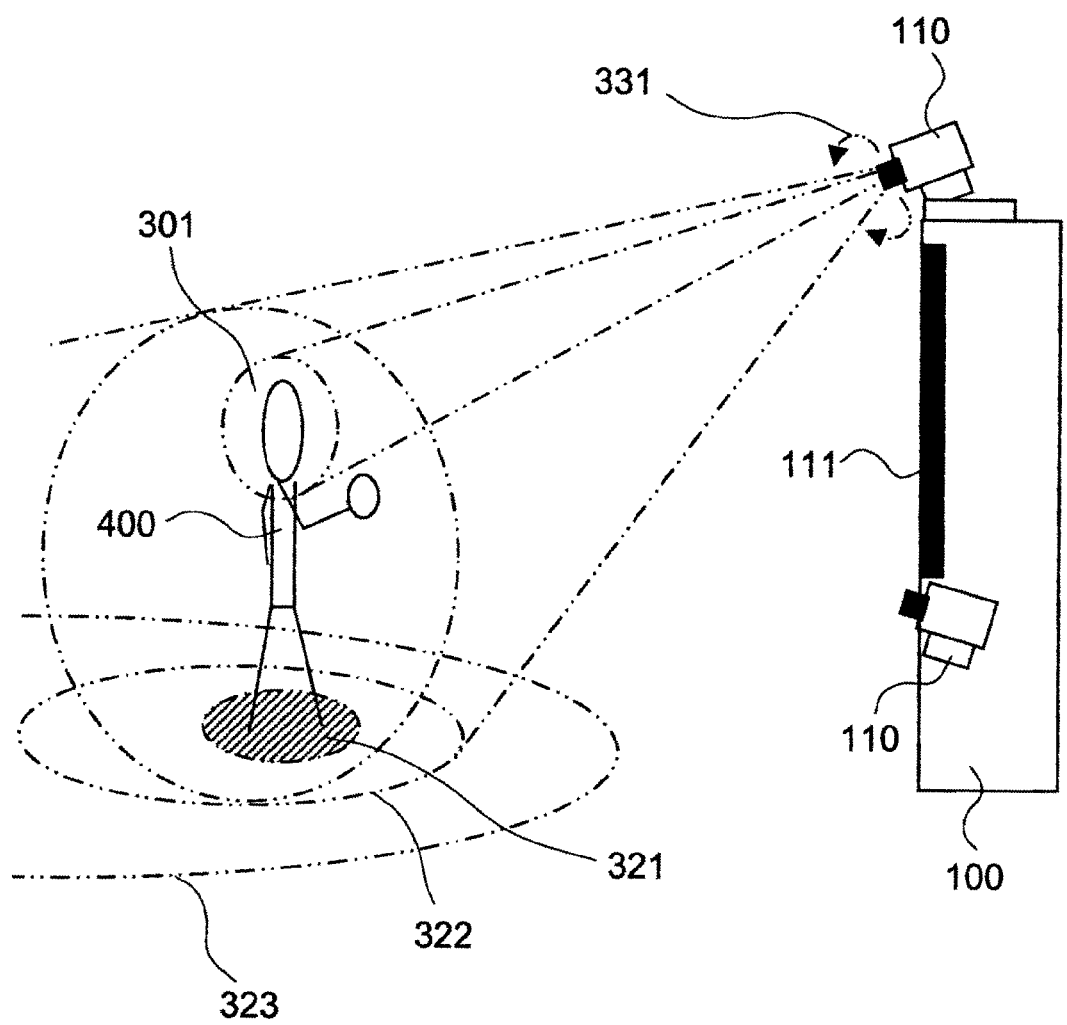
Figure 7:
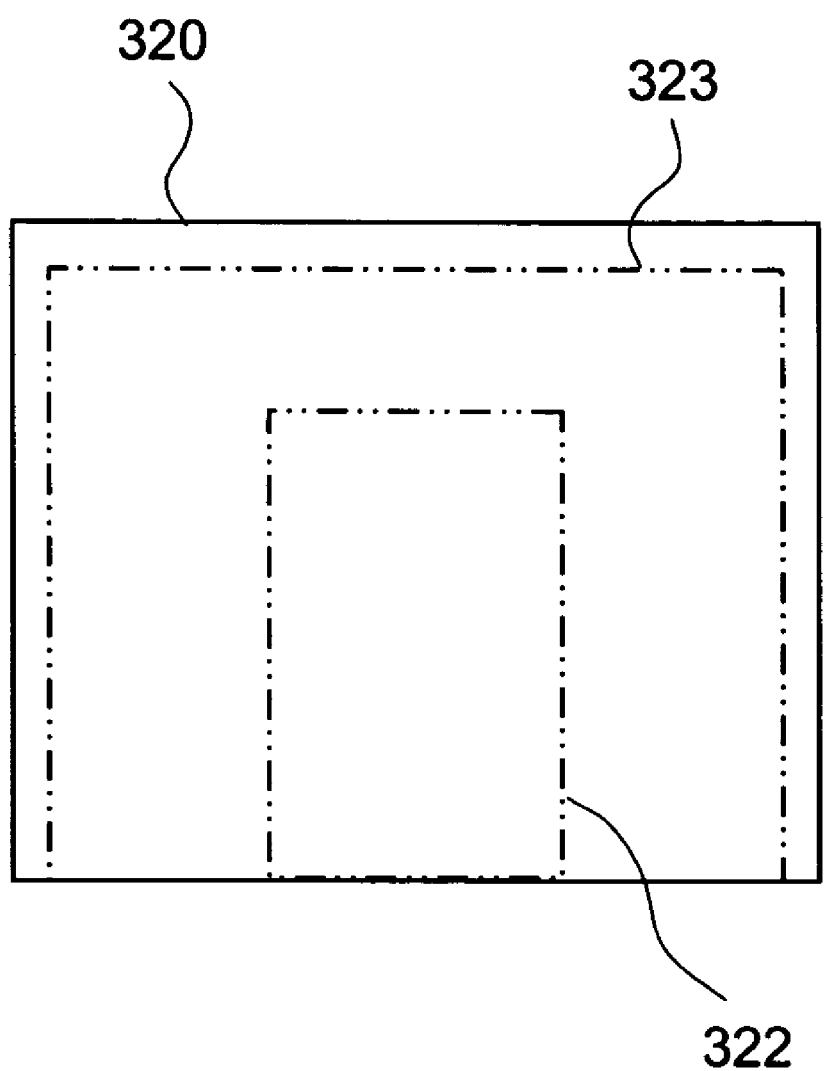
Figure 8:
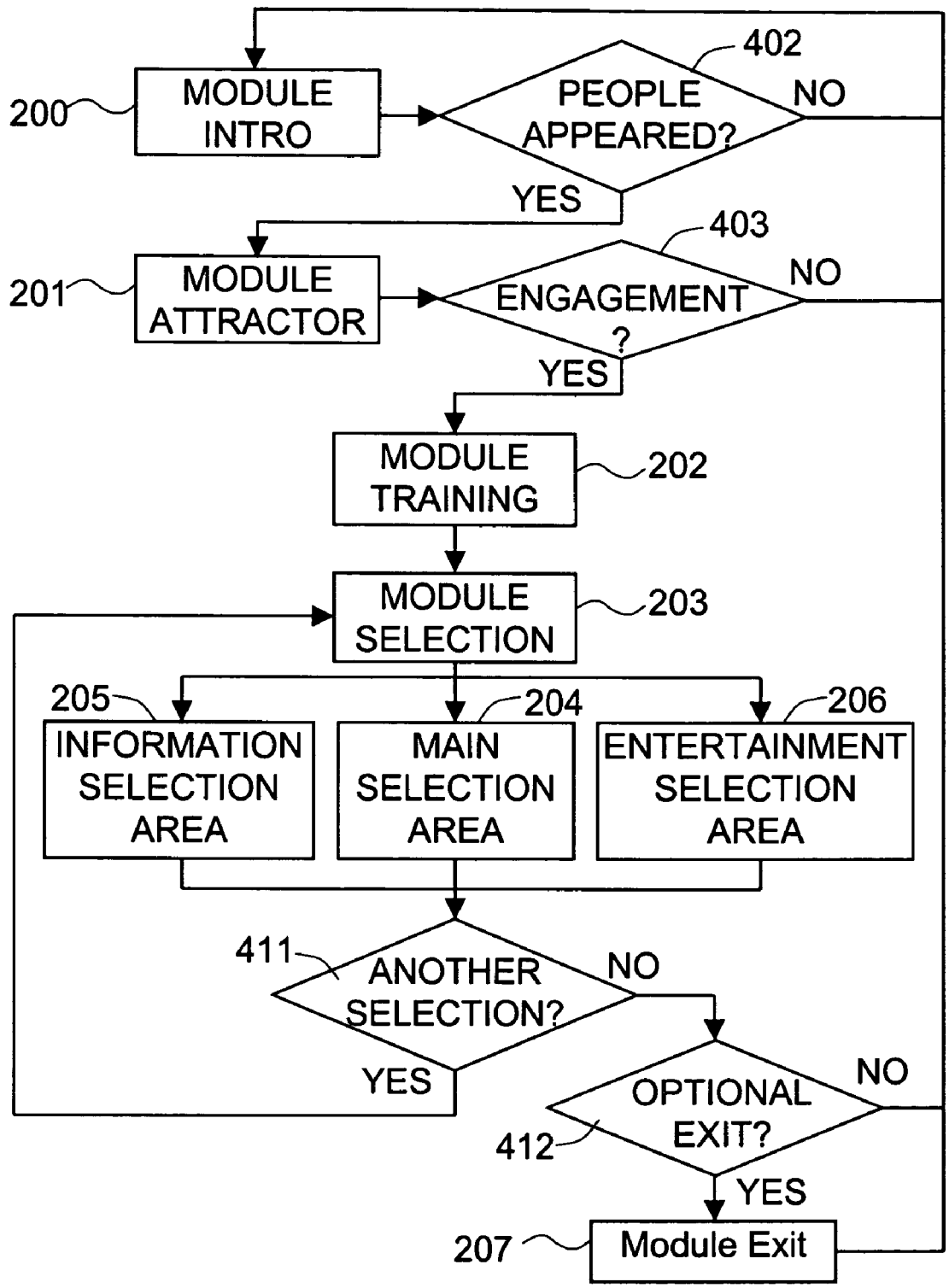
Figure 9:
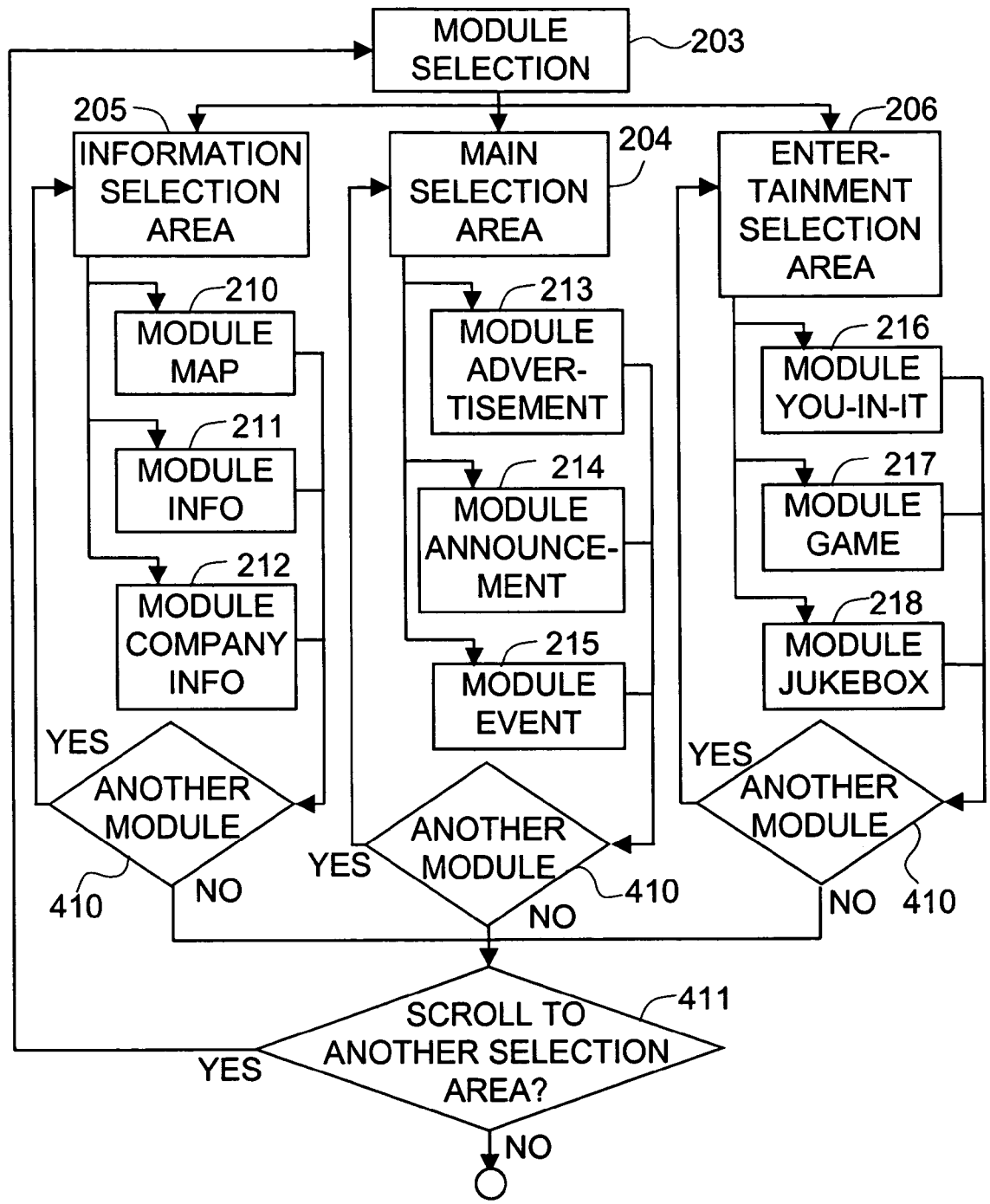
Figure 10:
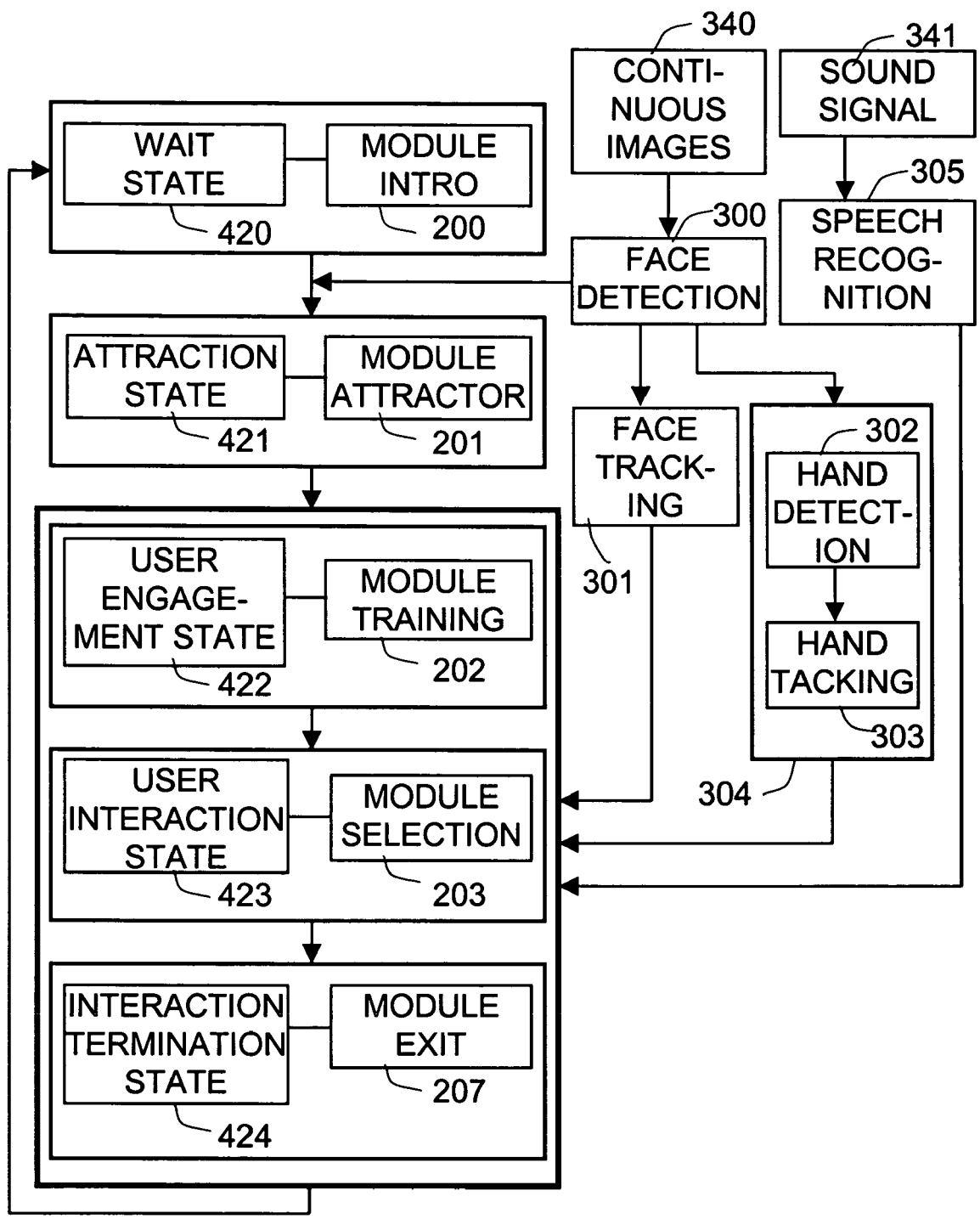
Figure 11:
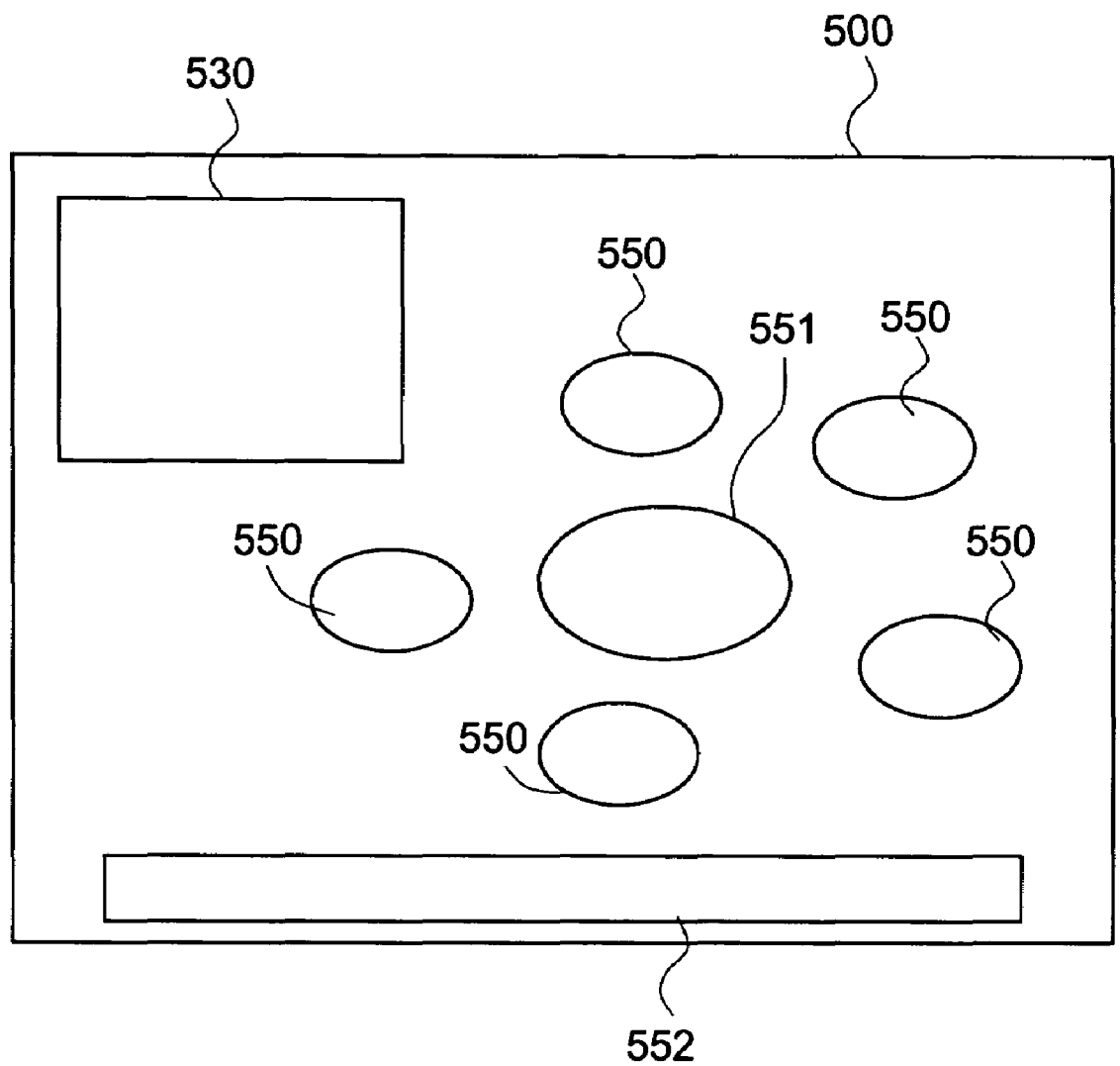
Figure 12:
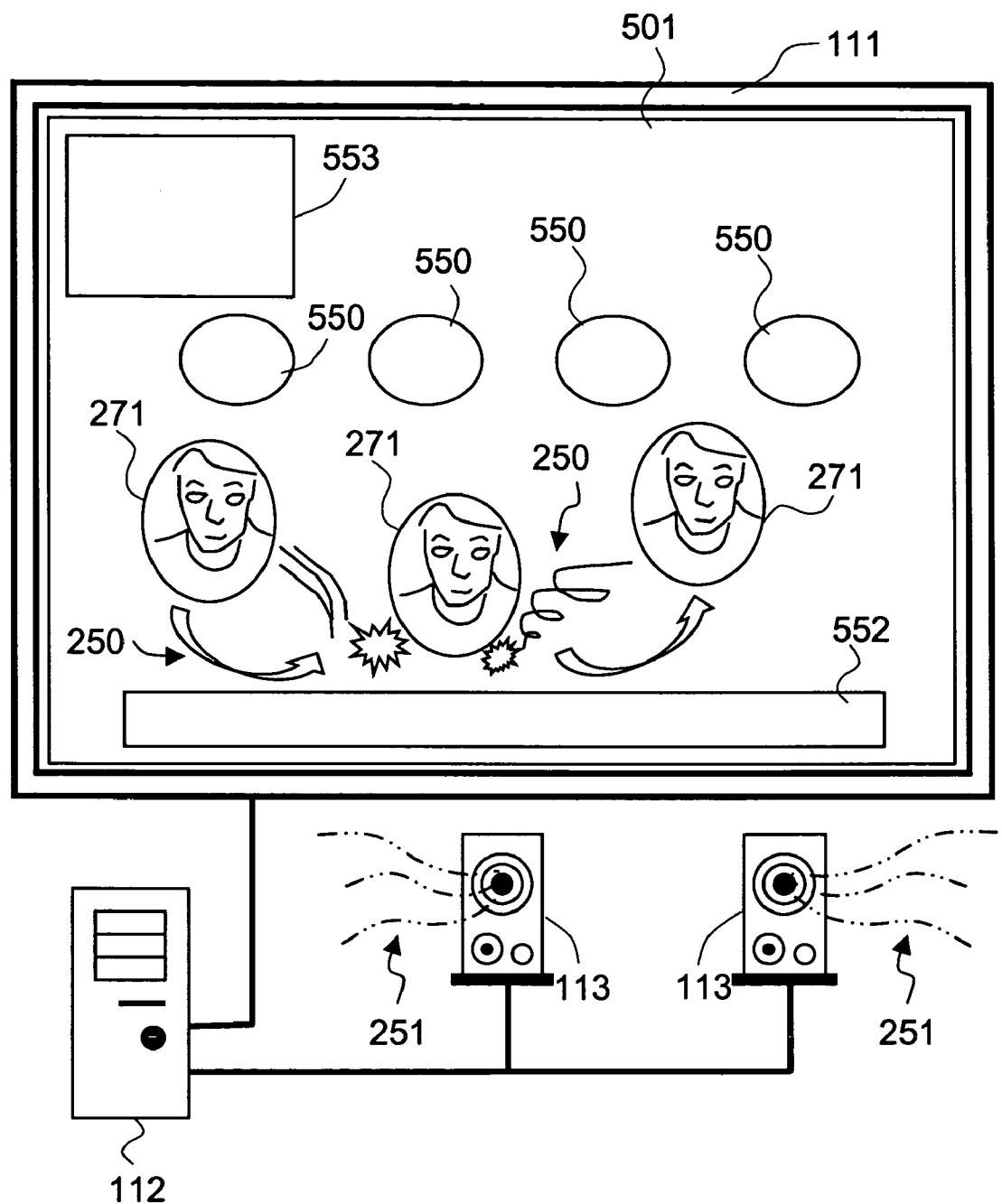
Figure 13:
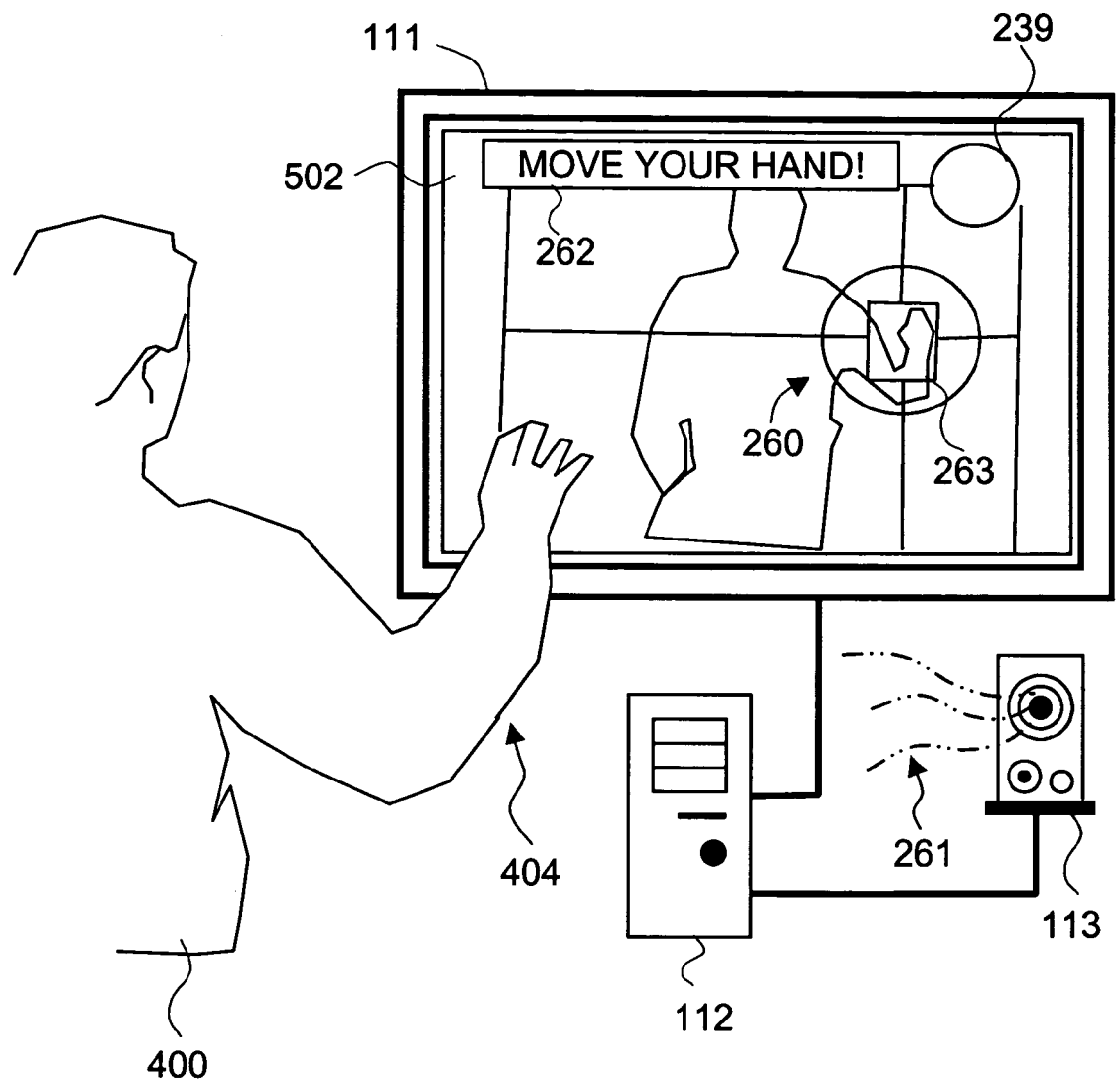
Figure 14:
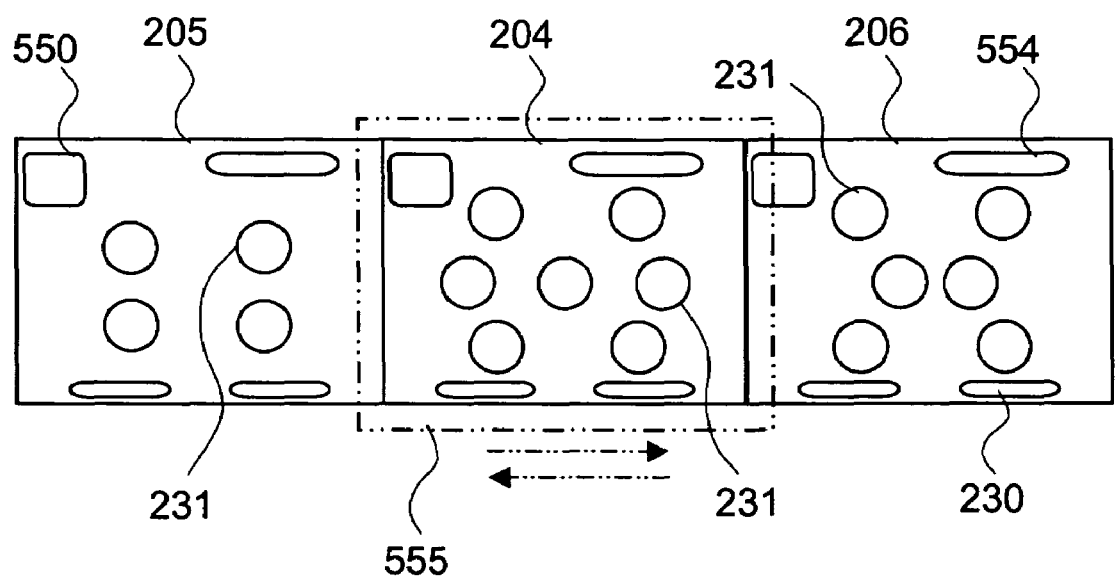
Figure 15:
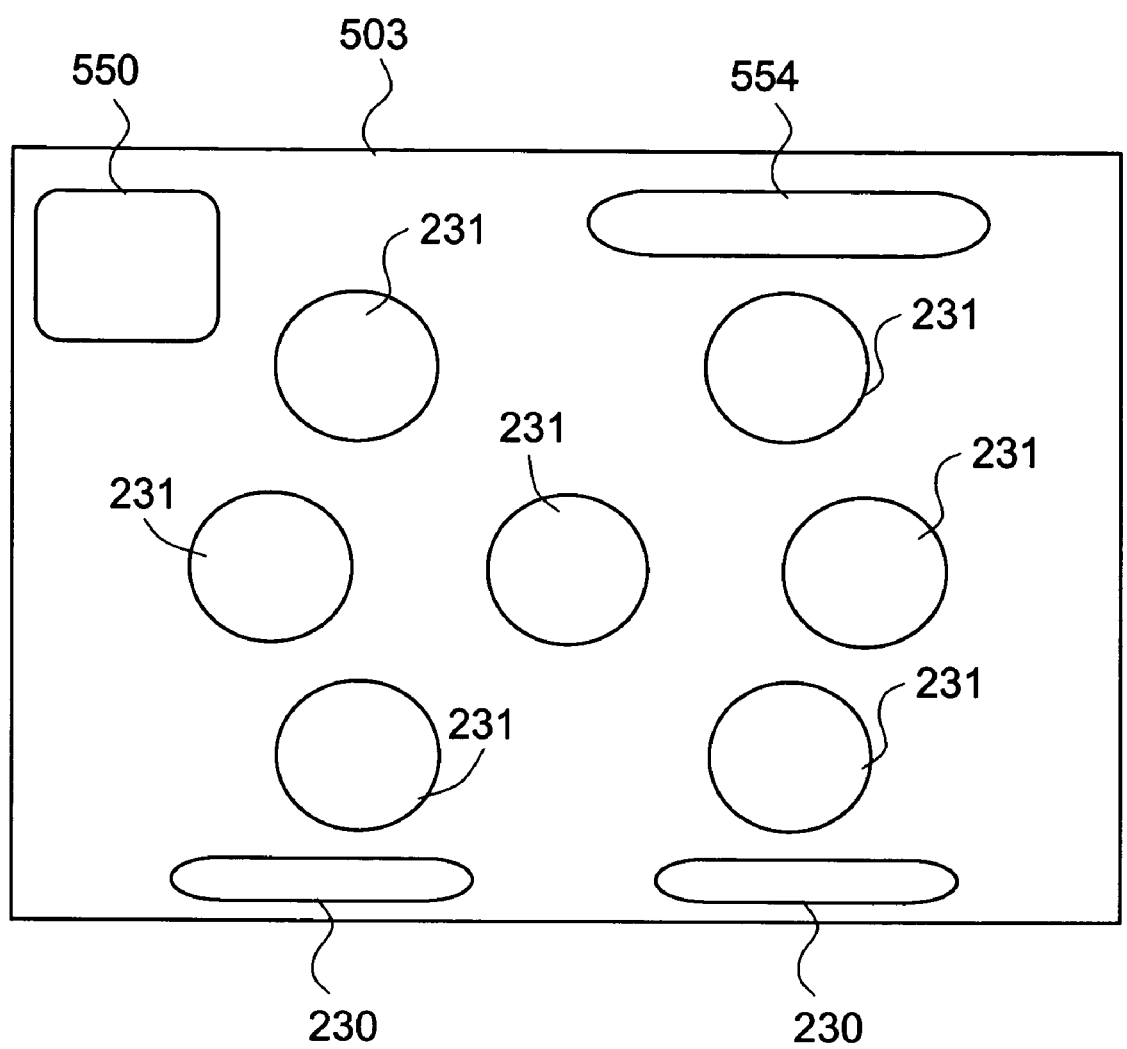
Figure 16:
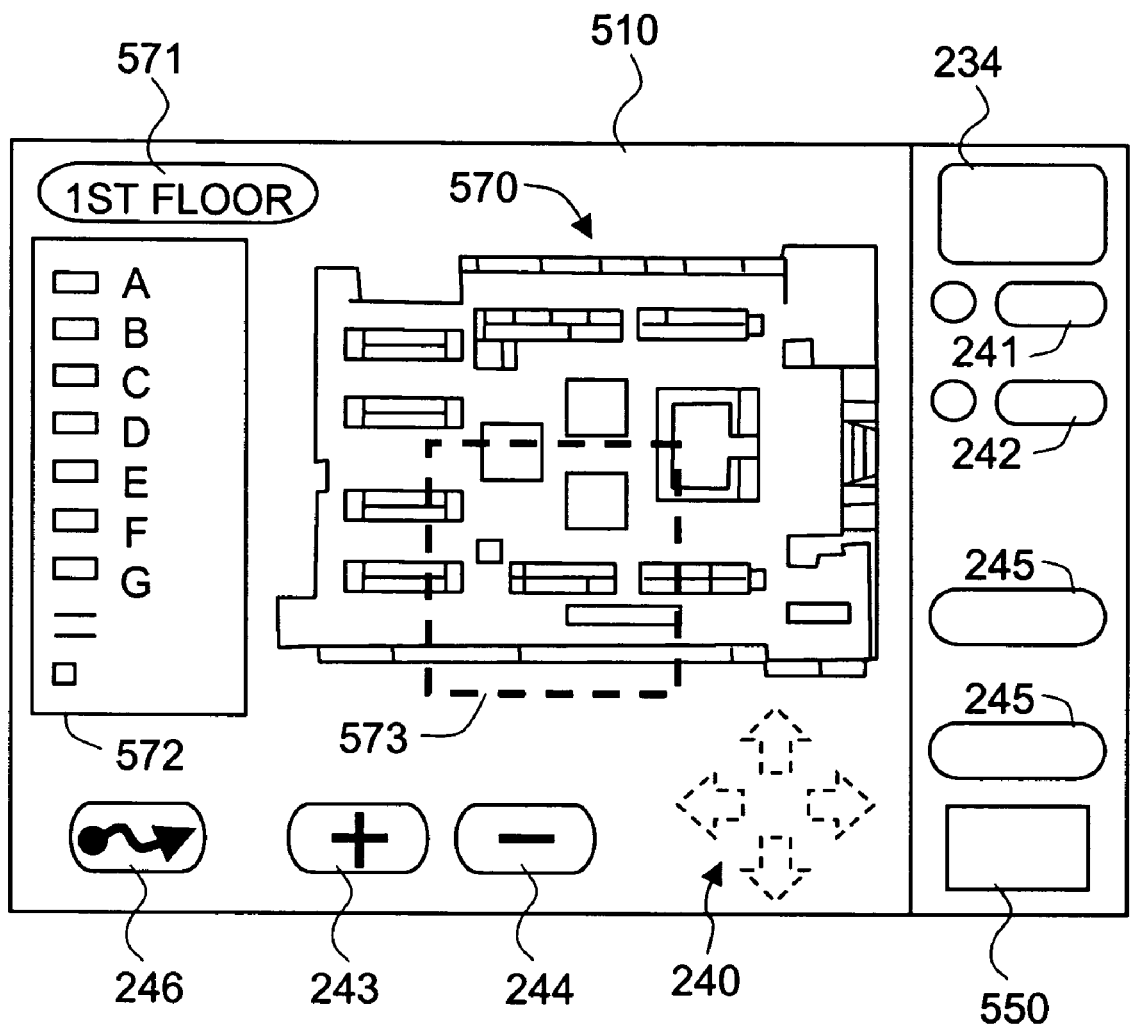
Figure 17:
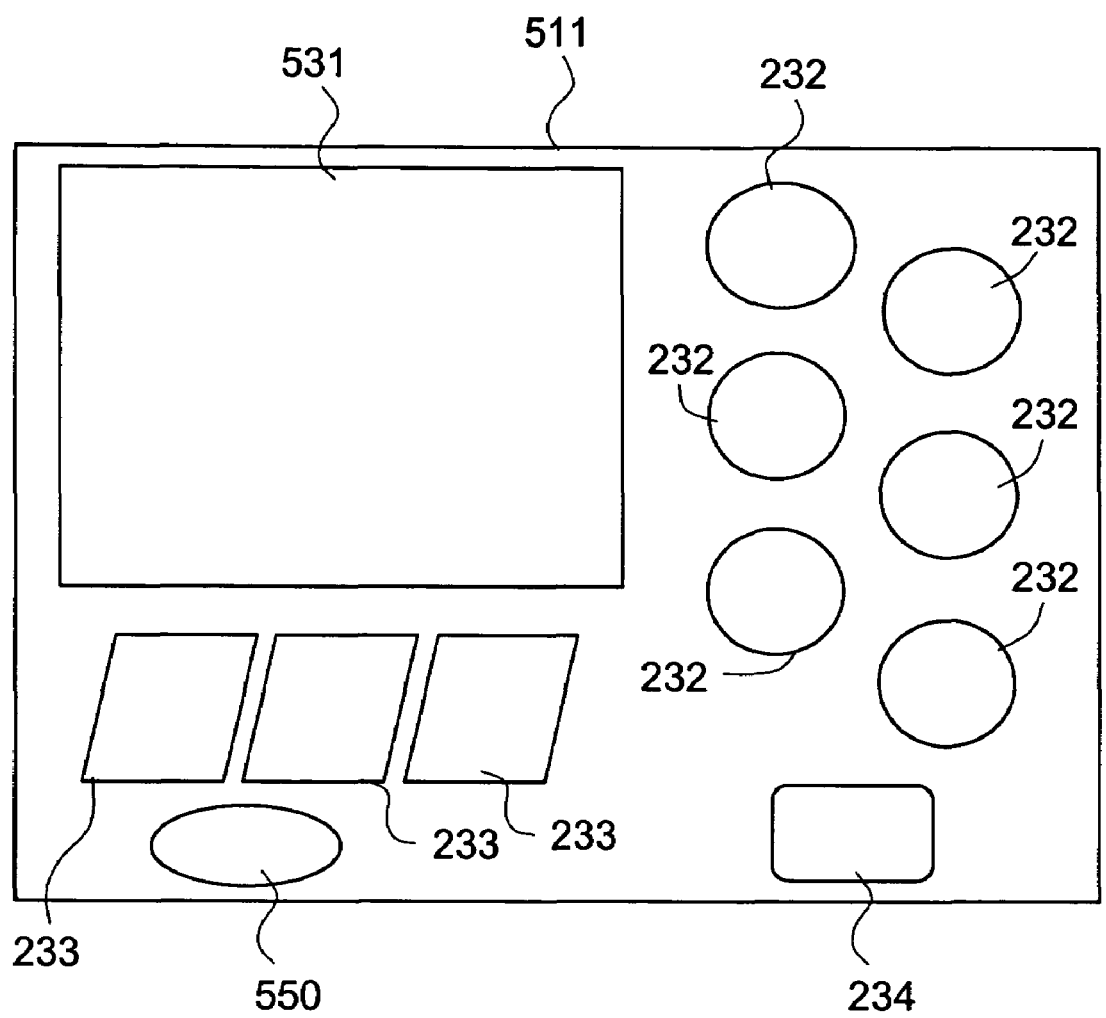
Figure 18:
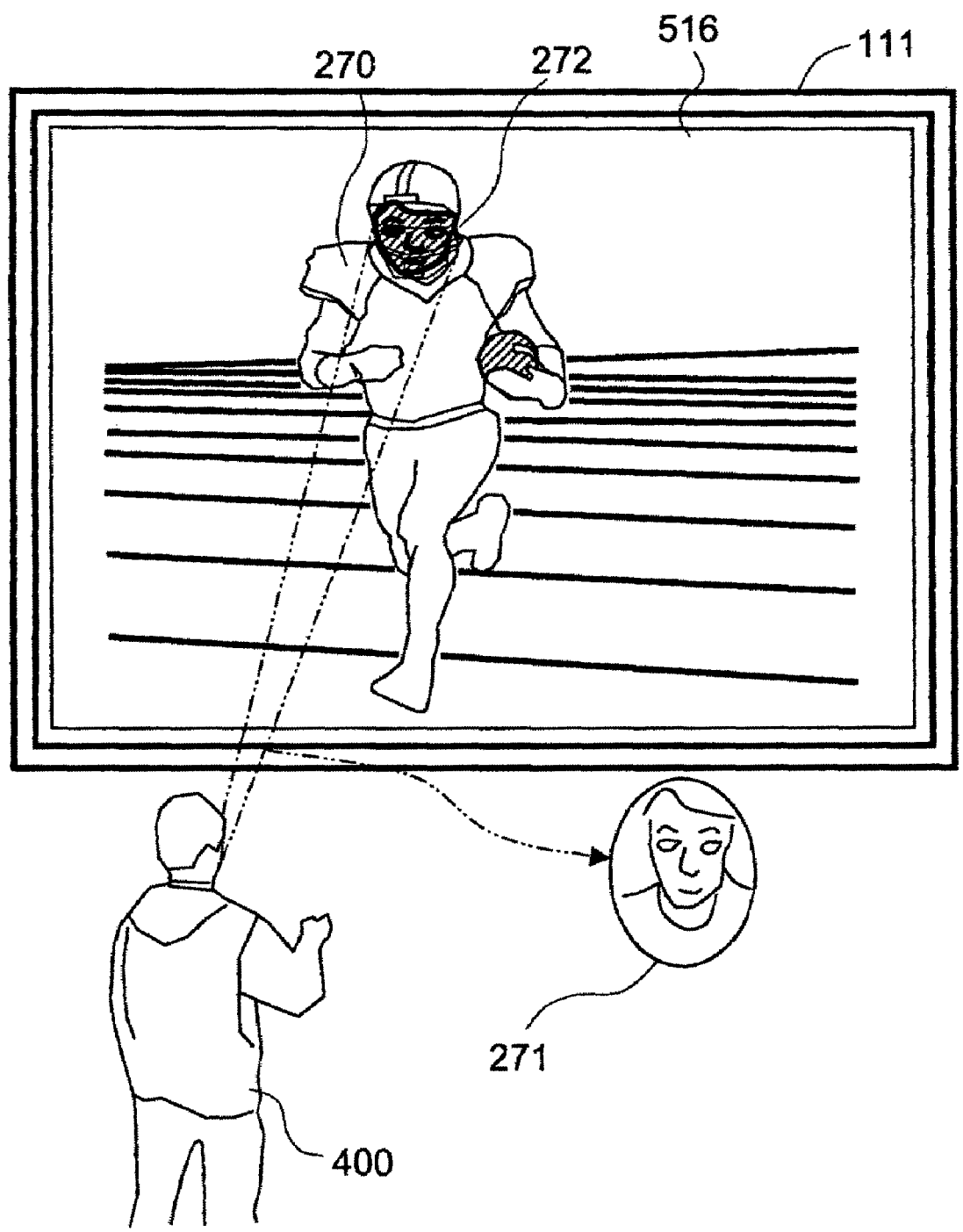
Figure 19:
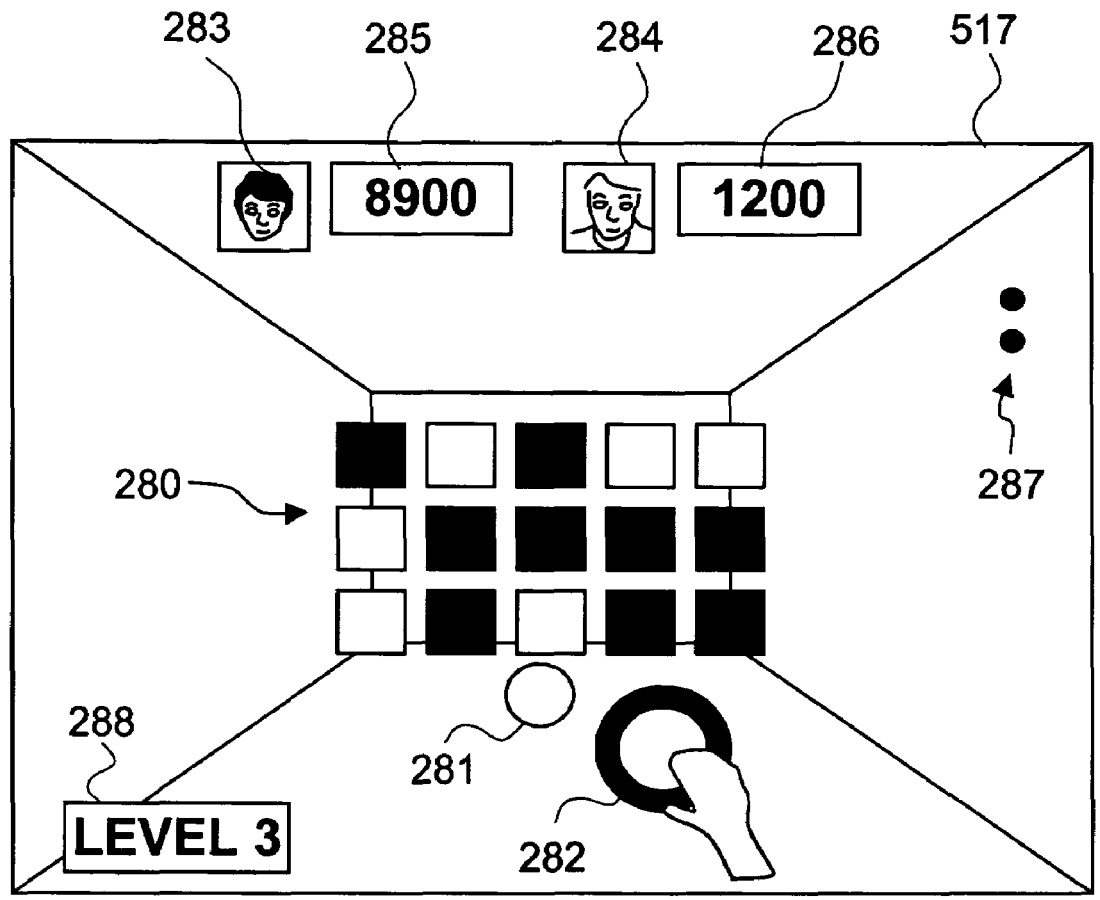
Figure 20:
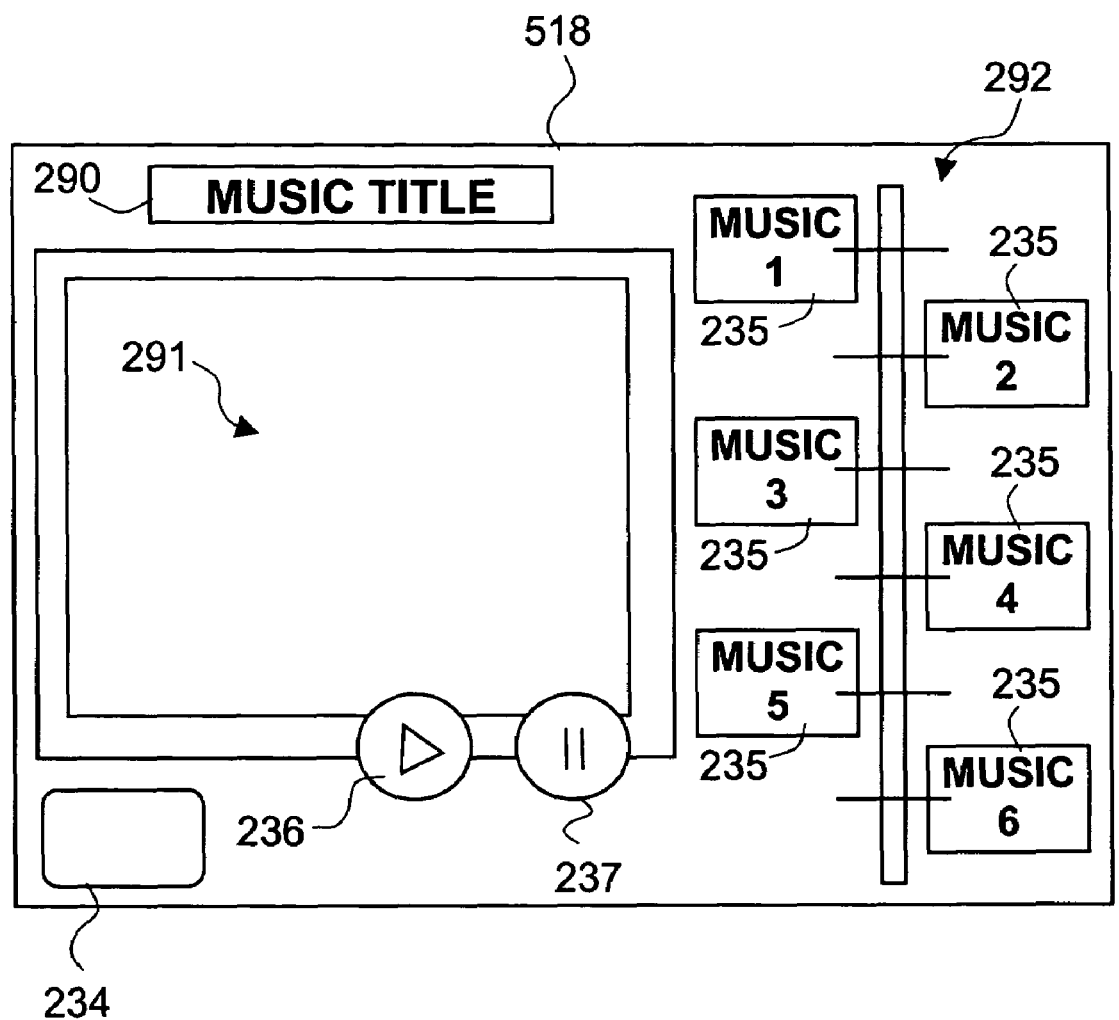
Figure 21:
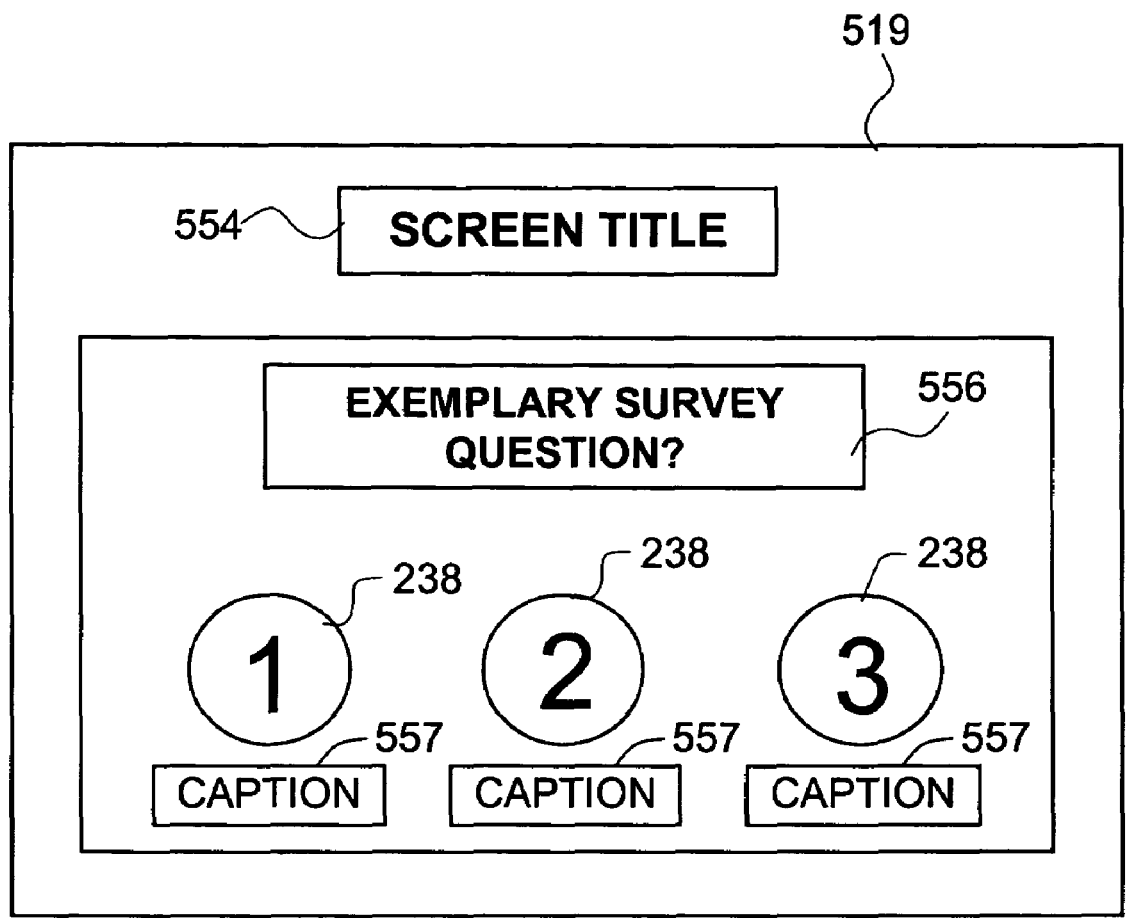

FIG. 1 shows the VTE Platform;
FIG. 2 shows the VTE Platform without Sound Dome;
FIG. 3 shows the VTE Platform embedded in the Wall;
FIG. 4 shows the System Components of the VTE Platform and the User Interaction;
FIG. 5 shows the Top-down View of the VTE Platform;
FIG. 6 shows the Side View of the VTE Platform;
FIG. 7 shows the Processing Zones in the frames of the image-capturing system of the VTE Platform;
FIG. 8 shows the Process States in the VTE Platform;
FIG. 9 shows the Process States for Module Selection and the 3 areas of the Module Selection in the VTE Platform;
FIG. 10 shows the relationship among the Interaction States, the Module Processing States, and the Vision Processing States in the VTE Platform;
FIG. 11 shows a screen shot of the exemplary Module Intro of the VTE Platform;
FIG. 12 shows an exemplary Module Attractor of the VTE Platform;
FIG. 13 shows an exemplary Module Training of the VTE Platform;
FIG. 14 shows a screen shot of the exemplary Module Selection of the VTE Platform;
FIG. 15 shows a screen shot of the exemplary Main Selection Area of the Module Selection of the VTE Platform;
FIG. 16 shows a screen shot of the exemplary Module Map of the VTE Platform;
FIG. 17 shows a screen shot of the exemplary Module Information of the VTE Platform;
FIG. 18 shows an exemplary Module You-In-It of the VTE Platform;
FIG. 19 shows a screen shot of the exemplary Module Game of the VTE Platform;
FIG. 20 shows a screen shot of the exemplary Module Juke-Box of the VTE Platform;
FIG. 21 shows a screen shot of the exemplary Module Survey of the VTE Platform;

DETAILED DESCRIPTION OF THE INVENTION

FIG. 1 shows the overall view of the VTE Platform. In this particular exemplary embodiment shown in FIG. 1, the VTE Platform consists of a housing 100, an advertisement space 101, an image-capturing system 110, a display system 111, a sound dome 115 with a speaker 116. The processing and controlling system 112 is connected to these systems and devices as in the exemplary embodiment shown in FIG. 4, and it is hidden inside the housing 100 in the exemplary embodiment shown in FIG. 1. A microphone 114 can be attached inside the sound dome 115 for the speech recognition 305 depending on the specific application, which requires human speech as one of the input modalities. As in the exemplary embodiment shown in FIG. 1, the VTE Platform can be used for the crowd interaction 406 between the VTE Platform and the crowd 401 in any public places.

The image-capturing system 110 can be either dynamic or static. The definition of the dynamic image-capturing system is that the image-capturing system should have capability to dynamically adjust all the conventional image-capturing system functionality, such as pan, tilt, zoom, focus, auto-exposure, and white balance, and the application of the VTE Platform should be able to control the image-capturing system with these capabilities according to the specific application needs. In the VTE Platform, such a dynamic image-capturing technology is called the DAS (Digital inter-Active Sensing) technology.

The definition of the static image-capturing system is that the image-capturing system does not have capability of the dynamic adjustment of the field of view, such as changing the pan and tilt. The static image-capturing system is useful for the applications, in which the constant field of view images are sufficient enough to meet the purpose of the specific applications. The static image-capturing system can provide a low cost solution usually.

The large display system 111 in the VTE Platform is efficient to attract people and to provide useful information and multimedia content. The housing 100 shown in the particular exemplary embodiment in FIG. 1 is a stand-alone example of the VTE Platform. The housing 100 is aesthetically designed to be attractive to the people. The particular VTE Platform in the exemplary embodiment shown in FIG. 1 is at nearly 10 feet tall with a rich multimedia display, and this is hard to miss in the public place, such as the exposition. The housing 100 can be designed to tear down and build up easily. The pieces of the housing 100 can be designed to be small enough to ship easily, fit through a regular size door, and be handled by one person. All hardware and access to electrical outlets can be secured in a form of a lockable cabinet or lockable housing 100.

The advertising space 101 as a part of the housing 100 can be used for any advertising purposes. The company logos, signs, or any attachable physical advertisement materials can be placed in the space. As this indicates, there are two advertising methods in the VTE Platform. One method is the digital advertisement by the rich multimedia digital content from the display system 111, and the other method is the physical advertising materials from the advertising space 101. The height of the advertising space 101 makes it easily noticeable by the people around the VTE Platform and tries to get the maximum advertisement effect.

However, the advertising space 101 can also be detached from the VTE Platform, in the exemplary embodiment shown in FIG. 1. For the place where the ceiling is not high enough to accommodate the full VTE Platform housing 100, the height of the housing 100 may be adjusted by detaching the top-most advertising space 101.

The sound dome 115 with a speaker 116 by the Brown Innovations is an example form of sound system 113 in the particular exemplary embodiment shown in FIG. 1., although the VTE Platform can use any form of sound system 113. The model of sound dome 115 used in the exemplary embodiment shown in FIG. 1 is 32" Single Localizer by the Brown Innovations. Its physical property has a 32-inch (0.8 m) diameter, 16-inch (0.4 m) height, 15 lbs (7.2 kgs) weight, and approximately 7.5 feet height from floor to the bottom of the dome. The amplifier/speaker requires maximum 50 watts per channel.

The speaker 116 inside the sound dome 115 is used for playing the audio content, attracting the user to the system, announcing important message, and giving the instructions to the user. The sound dome 115 helps to localize the sound from the speaker 116 of the sound dome 115, so that the user might hear well in a crowded environment.

A microphone 114 can be attached to the sound dome 115 as an optional device, which is used for speech recognition 305 of the voice input (sound signal) 341, from the user. Speech recognition 305 may be used as one of the input modalities for certain applications. If a specific application does not require the speech recognition 305, the microphone 114 to the VTE Platform is not necessary and it can be removed. The IBM ViaVoice or the Nuance Speech Recognition System Version 7.0.3, may be used as the speech recognition 305 software in the particular exemplary embodiment shown in FIG. 1.

FIG. 2 shows another exemplary embodiment of the VTE Platform and different scenario of user interaction, a single user interaction 405. In this particular exemplary embodiment shown in FIG. 2, the VTE Platform consists of the housing 100, an advertisement space 101, an image-capturing system 110, and a display system 111. As it shows in the FIG. 2, the VTE Platform may run without the sound dome 115. The user 400 may be a single user.

The VTE Platform can place the normal speakers inside the housing 100. A subwoofer speaker can be hidden anywhere in the housing 100 also. Usually the best place for the subwoofer speaker is the bottom-most and farthest corner of the room from the listener.

FIG. 3 shows another exemplary embodiment of the VTE Platform and different scenario of the user interaction. The VTE Platform and its image-capturing system 110, and the display system 111 may be embedded in the wall, as in the particular exemplary embodiment shown in FIG. 3. The embedded VTE Platform may be used in any public places, which could optimize the space utilization without requiring obtrusive structure to the preexisting environment. The user 400 can interact with the VTE Platform, where the digital multimedia content of the VTE Platform might be directly connected to the context of the public place. For example, in the exemplary embodiment shown in FIG. 3, the public place could be an airport, and the user 400 can get his own customized flight information through the Touch-free interaction 304 right on the spot.

FIG. 4 shows the System Components of the VTE Platform and the User Interaction. It shows the overall system that provides the hardware and application context for the present invention. The hardware components of the system consist of image-capturing system 110, output display system 111, processing and controlling system 112, sound system 113, microphone 114, and lighting system 117.

In this exemplary embodiment shown in FIG. 4, a camera, such as the Sony EVI-D30, and frame grabber, such as the Matrox Meteor II frame grabber, may be used as the image-capturing system 110 if dynamic control is needed. A firewire camera, such as the Pyro 1394 web cam by ADS technologies or iBOT FireWire Desktop Video Camera by OrangeMicro, or a USB camera, such as the QuickCam Pro 3000 by Logitech, may be used as the image-capturing systems 110 if dynamic control of the field of view is not needed. Multiple of such image-capturing systems 110 can be used for stereo hand tracking. In this exemplary embodiment shown in FIG. 4, three image-capturing systems 110 may be used.

A large display screen, such as the Sony LCD projection data monitor model number KL-X9200U, may be used as the output display system 111 in the exemplary embodiment. A computer system, such as the Dell Precision 420, with processors, such as the dual Pentium 864 Mhz microprocessors, and with memory, such as the Samsung 512 MB DRAM, may be used as the processing and controlling system 112 in the exemplary embodiment. The processing and controlling system 112 processes the Touch-free interaction 304 between the VTE Platform and the user 400. Any appropriate sound system 113 and wired or wireless microphone 114 can be used for the invention. In the exemplary embodiment, the Harman/Kardon multimedia speaker system may be used as the sounding system 113 and audio-technica model ATW-R03 as the microphone 114. Any appropriate lighting, in which the user's face image is recognizable by the image-capturing system 110 and processing and controlling unit 112, can be used for the invention as the lighting system 117. The lighting system 117 can use any normal lighting devices, and it is preferable to use diffused lighting. The lighting is mounted so that it does not direct light into the user's eyes yet illuminate the face of the user 400. The lighting can be mounted on the front of the housing 100 unit or overhead of the unit using lighting tubes.

The processing software may be written in a high level programming language, such as C++, and a compiler, such as Microsoft Visual C++, may be used for the compilation in the exemplary embodiment. Image creation and modification software, such as Adobe Photoshop, may be used for the virtual object and stage creation and preparation in the exemplary embodiment.

FIG. 5 shows the Top-down View of the simplified VTE Platform, FIG. 6 shows the Side View of the VTE Platform, and FIG. 7 shows the Processing Zones in the frames of the image-capturing system 110 of the VTE Platform.

In the exemplary embodiment of the VTE Platform shown in FIG. 5 and FIG. 6, the VTE Platform may use an active sensing technology, called the DAS (Digital interActive Sensing) Technology of the AIT. The active sensing technology automatically adjusts the angle of the pan 330 and the tilt 331 of the image-capturing system 110, depending on the user position and height, relative to the position and height of the VTE Platform. Since different people have different height and preference of standing position in front of the VTE Platform, the angles of the image-capturing system 110 may have be adjusted every time when a new user 400 appears.

In the VTE Platform, the field of view 320 from the image-capturing system 110 may be divided into 3 different imaginary zones and 1 imaginary hot spot 321. The zones are called the user zone 322, the watcher zone 323, and the passers-by zone 324. The boundary of each zone can be flexibly adjusted depending on the specific application. Usually, the watcher zone 323 is the superset of the user zone 322, and the passers-by zone 324 is the superset of the watcher zone 323 and the user zone 322. However, the zones do not have to follow this set relation always, and the boundary of the zones could be overlapped or exclusive depending on the application specifications. There could be also multiple user zones 322, watcher zones 323, and passers-by zones 324.

The entire field of view 320 of the image-capturing system 110 is usually the passers-by zone 324. Within this passers-by zone 324, the VTE Platform observes the crowd traffic and tries to sense and attract the people who pass nearby the VTE Platform. When there are no people nearby the VTE Platform, it stays in the default Wait State 420 and plays the digital contents, designed for the default Wait State 420, such as playing the video loops.

The watcher zone 323 is usually equal to or smaller than the passers-by zone 324, and it is usually the superset of the user zone 322. If there are people within the watcher zone 323 for a certain duration of time, and the face(s) of the people is(are) detected, the VTE Platform knows that there are people who show interest to the platform and may try to customize the advertisement according to the demographic information. However, when there is no person within the user zone 322, which is usually the smaller area inside the watcher zone 323, the VTE Platform also knows that there is no user 400 who actually interacts with the system and the VTE Platform does not start the actual interaction stages until a person is in the user zone 322. This state is called the Attraction State 421, and in this state the VTE Platform tries to attract the people and encourage a person to interact with the system.

When a person among the people in the watcher zone 323 steps into the user zone 322, the person is said to be promoted from a watcher to a user 400, and the VTE Platform changes its current execution state from the Attraction State 421 to the User Engagement State, and the corresponding modules in the VTE Platform begin execution. Once a user 400 steps into the user zone 322, the VTE Platform begins the actual interaction steps, starting from the training step of the User Engagement State 422.

The execution between the zones does not have to follow the order always, such as the watcher zone 323 first, then the user zone 322 next. Sometimes, the person directly steps into the user zone 322, and it could happen very quickly without giving any needs for the VTE Platform to process modules intended for the watcher zone 323. In this case, the VTE Platform can make a transition immediately to the User Engagement State 422 and the following User Interaction State 423 and begin the corresponding modules in the VTE Platform.

When the person steps out of the user zone 322, it is said to be demoted, and the person becomes from a user 400 to a watcher. In order to give the user 400 a certain degree of the freedom of movement, the boundary of the zones between the user zone 322 and watcher zone 323 can be loosely defined, and a time-out scheme can be applied to decide whether the person really steps out of the user zone 322 or not. For example, a person might not exactly stand in the middle of the user zone 322, but a little bit on one side of the user zone 322, yet still wants to interact with the system. As long as the user 400 does not step out of the user zone 322 totally, the person might still be able to interact with the system as a user 400. If the user 400 steps out of the frame view totally, then the user 400 is regarded left from the VTE Platform, and the system goes back into the default Wait State 420.

The Hot Spot 321 is a conceptual place on the ground in front of the VTE Platform, where the VTE Platform can sense the person as a user 400 for sure. The Hot-Spot 321 is usually in the center of the user zone 322. It is an imaginary position, but it can also be physically marked, using any noticeable signs, devices, or structures, to help the user 400 to know where to stand.

In many cases, the image-capturing system 110 is mounted in front of unit above the display system 111 in the VTE Platform. The position of the image-capturing system 110 can be engineered to different positions than the top center of the VTE Platform, as in the exemplary embodiment of the VTE Platform shown in FIG. 6. Another exemplary mounting position of the image-capturing system 110 will be the bottom of the display system 111. The housing 100 can be designed to have an area, which allows multiple image-capturing systems 110. The image-capturing system 110 area needs to be accessible by technicians without having to removing multiple parts of the housing 100. Ideally, the image-capturing system 110 shall be accessible from behind the housing 100 where the other hardware is accessible.

FIG. 8 shows the Process States in the VTE Platform. FIG. 9 shows the Process States for Module Selection 203 and the 3 areas of the Module Selection 203 in the VTE Platform in more details. FIG. 10 shows the relationship among the Interaction States, the Module Processing States, and the Vision Processing States in the VTE Platform.

Module Intro 200 is the default module that corresponds to the Wait State 420 in the VTE Platform. When there are no people near-by the VTE Platform or within the field of view 320 of the image-capturing system 110, the VTE Platform is in the Wait State 420 and the Module Intro 200 executes its processes. The content of the Module Intro 200 can be anything, which the owner of the specific VTE Platform wants to show to the public. For example, it can play advertisement video.

When the people appear 402 within the field of view 320 of the image-capturing system 110, the VTE Platform detects the people from the captured continuous images 340 and begins to execute the Module Attractor 201 processes. The Module Attractor 201 tries to entice a person or people to interact with the system.

Although the VTE Platform can be designed to interact with multiple users, a single user 400 interaction is the primary interaction scenario. When a user 400 shows interest to the system and steps into 403 the user zone 322, the VTE Platform goes to the Module Training 202 in the User Engagement State 422. Module Training 202 introduces the user 400 how to use the system, especially how to do the Touch-free interaction 304. This is an important module to those who do not know how to use the system. Module Training 202 is an optional state because the user 400 might be a returning user 400, who already knows how to use the system and goes into the main content directly without spending time in the training process. The content of the Module Training 202 can be a form of game or simple and cool exemplary hand motion action, such as virtual hand-scan.

After the Module Training 202, the VTE Platform executes the Module Selection 203. Module Selection 203 is a place where the user 400 navigates through and gets the useful information or exciting entertainment experience through the contents provided. This state is called User Interaction State 423. The design of the Module Selection 203 totally depends on the goal of the content management team of the particular embodiment of the VTE Platform.

In the exemplary embodiment shown in FIGS. 8 and 9, the Module Selection 203 is designed to have 3 different areas, such as the Main Selection Area 204, the Information Selection Area 205, and the Entertainment Selection Area 206. However, the Module Selection 203 could have more areas or simply one area depending on the application goal of the particular embodiment of the VTE Platform. Among the areas, the user 400 is able to navigate from one area to another area, by selecting another area 411. Each area contains sub-modules, and the user 400 is also able to navigate from one module to another module within the same area, by selecting another module 410. The sub-modules actually contain contents provided by the content management team of the particular embodiment of the VTE Platform.

The Main Selection Area 204 typically contains important contents, which the owner of the particular VTE Platform specifically wants to show to the user 400 at first because it is the first area the user 400 sees in the Module Selection 203. Some examples of the content are welcome message, onsite shopping, advertisement, news, general announcement, services offered, and event announcement. In the exemplary embodiment shown in FIG. 9, the Module Advertisement 213, the Module Announcement 214, and the Module Event 215 are shown as exemplary modules placed in the Main Selection Area 204 of the Module Selection 203.

The Information Selection Area 205 contains contents, which are aimed to providing information to the user 400. The content of the information is vastly up to the owner of the particular VTE Platform. Some examples of the information content might be map, general information, company information, directory, weather forecast, and educational content. In the exemplary embodiment shown in FIG. 9, the Module Map 210, the Module Info, and the Module Company Info are shown as exemplary modules placed in the Information Selection Area 205 of the Module Selection 203.

The Entertainment Selection Area 206 contains contents, which provide the user 400 entertainment, such as gaming, music, physical training program, and other visual fun stuff. In the exemplary embodiment shown in FIG. 9, the Module You-In-It 216, the Module Game 217, and the Module Juke-Box 218 are shown as exemplary modules placed in the Entertainment Selection Area 206 of the Module Selection 203.

The buttons on the screen are designed to be selectable. By selecting a button, the user 400 can go into the chosen module, which is linked to the button. Instructions for selectable buttons can be shown to the user 400 when there is a pause of interaction. This is particularly useful for a new user 400. Selection count down, selection teaser, and selection meter are some of the useful tools, which can aid the user 400, for the selection.

After the user 400 navigated through the modules in the Module Selection 203, the user 400 can proceed to the optional Module Exit 207, by selecting it 412. This state is called Interaction Termination State 424. The form of the Module Exit 207 is also up to the content management team. In the particular exemplary embodiment shown in FIG. 8, the Module Exit 207 can be a form of survey. The VTE Platform is able to gather the demographic data automatically, such as the number of the users, the duration in which some specific users used the system, or gender and age of the user. However, with the explicit survey in the Module Exit 207, the owner of the VTE Platform can gather more detailed and specific data, which is not possible to get using the computer vision and image processing technology, about the demographics.

The examples of the survey will be "Did you like the item X?" or "What is your preference among A, B, and C?" Here, the VTE Platform can automatically customize the variable X and A, B, and C, internally analyzing the interaction results, which are gathered while the user 400 was navigating the contents. For example, the user 400 might have selected a module, which gives information about the product list. The user 400 might have selected some specific items for a specific product, which the user 400 was interested in. The VTE Platform can gather the statistics of the products and items, and it also specifically ask questions about the products and items in the survey or the Module Exit 207.

This Module Exit 207 is one of the optional modules because some users might just want to leave from the VTE Platform as soon as the interaction terminated. Regardless of the fact that the user 400 chose the Module Exit 207 or not, when the interaction finishes, the VTE Platform goes back to the default Wait State 420 and starts the Module Intro 200.

FIG. 10 shows the relationship among the Interaction States, the Module Processing States, and the Vision Processing States in the VTE Platform.

In the Module Intro 200 mode, the face detection 300 in Computer Vision may be used as one exemplary method to know whether a person or multiple people appeared in front of the system or not. When a face or multiple faces are detected, the system begins to attract the user 400 or crowd 401 to the system interaction. This is the Attraction State 421 and the corresponding module in the VTE Platform is the Module Attractor 201. After the faces are detected, the VTE Platform begins the face tracking 301, the hand detection 302, and the hand tracking 303 of the people.

For the face detection 300, any robust, reliable, and efficient face detection method can be used. In the exemplary embodiment shown in FIG. 10, a neural network based face detector or SVM based face detection method may be used. M. Yeasin, and Y. Kuniyoshi, Detecting and Tracking Human Face and Eye Using Space-Varying Sensor and an Active Vision Head, In Proceedings of IEEE Conference on Computer Vision and Pattern Recognition, Volume 2, Pages 168-173, 2000 explains about the neural network based face detector in more details.

After the face is detected within the entire input frame, an independent face tracker begins the tracking of the user's detected face. Although, the neural network face detector is reliable, it requires significant amount of processing time generally in actual embodiment of the algorithm.

In order to make the VTE Platform system to work in real time, efficient use of tracking may be used in cooperation to the face detection 300, so that the face-tracking step, which generally uses much less processing time, takes over the face image processing task right after the initial face is detected. This enables the system to do the entire region face detection 300 only at the beginning of the user interaction. After the initial global face detection 300, face-tracking process provides the information about the user's face image position and size. The tracking method can be any reasonably reliable and efficient face tracking method. In the exemplary embodiment shown in FIG. 10, the skin-color and Viterbi algorithm based tracking method may be used. The details of the algorithms can be found in N. Krahnstoever, S. Kettebekov, M. Yeasin, and R. Sharma, "iMap: A Real-Time Framework for Natural Multimodal Interaction with Large Screen Displays," Dept. of Comp. Science and Eng. Technical Report CSE-02-010, Pennsylvania State University, May 2002.

The main visual interaction modality is continuous gesture recognition. Unlike with previous gesture recognition systems, as explained in R. Bolt,"Put-that-there: Voice and gesture at the graphic interface," In SIGGRAPH-Computer Graphics, 1980, the user does not have to adhere to specific predefined gestures. The Touch-free Interface is able to track the natural gestures, i.e., gestures that a person has a natural tendency to perform when interacting with large screen displays. This approach increases the naturalness of our system tremendously. However, the gesture recognition component is no longer able to solely carry the complete intent of the user. Rather, the semantics of a command or request becomes distributed across the speech and gesture.

Speech recognition has improved tremendously in recent years and the robust incorporation of this technology in multimodal interfaces is becoming feasible. The VTE Platform can operate with speaker independent recognition engines, similar to the i-Map system described in N. Krahnstoever, S. Kettebekov, M. Yeasin, and R. Sharma, "iMap: A Real-Time Framework for Natural Multimodal Interaction with Large Screen Displays," Dept. of Comp. Science and Eng. Technical Report CSE-02-010, Pennsylvania State University, May 2002. Speaker independence is essential for domains where potential users are unknown and speech training is infeasible (e.g., for commercial systems operating in public). Limited vocabulary of alphabets, numerals, and Yes/No are used. This is because the possible database for the context, where the particular VTE Platform is used, can be really vast, and natural continuous speech recognition would require a huge vocabulary for this kind of specific application. The speech recognition 305 module of the system only reports time-stamped annotations to the application front end, which is responsible for the modality fusion.

The VTE Platform framework provides audio feedback to the user 400, so as to continue a meaningful dialog session. Audio feedback can be as simple as sound effects that confirm the successful capture of a user's commands (e.g., a selection noise when a button was selected) or in the form of pre-recorded speech from a narrator or text to speech synthesis. The choice of appropriate feedback depends on the context. While sound effects are sufficient for narration, a speaking and animated avatar is much more appropriate while conducting a dialog with the user 400.

Fusion of audio and visual cues is a difficult problem by nature. Humans routinely perform complex and simple tasks in which ambiguous auditory and visual data are combined in order to support accurate perception. By contrast, automated approaches for processing multimodal data sources lag far behind. This is primarily due to the fact that few methods adequately model the complexity of the audio/visual relationship. Here, we will focus on the development of a synergistic integration principle, supported by the synchronization of the multimodal information streams on temporal coherence principles. The VTE Platform can use the probabilistic approach for fusion of multiple modalities.

The Computer Vision technologies in the VTE Platform can be summarized as the "3I Technology", which can be used in an independent fashion and in bundles. They are Interactive Technology, Immersive Technology, and Intelligent Technology.

The Interaction Technologies include face/body detection, localization, tracking, gesture recognition and multi-modal (vision & speech) integration to facilitate interaction with digital content, appliances for information access and entertainment The Immersive Technologies include 3 types of immersions, such as passive immersion, active immersion, and mixed immersion (Augmented Reality). The passive immersion integrates a user's face and body into an application or video. The user(s) face/body is immersed in selectable background, such as group photos in college campus background. The active immersion allows users to control avatars constructed using the user's face image. The mixed immersion (Augmented Reality) allows users to virtually interact with virtual objects (e.g. trying on virtual clothes, or user immersion in digital content with overlay of virtual apparel such as headwear, eyewear for playful paraphernalia).

The Intelligence Technologies include the gathering of usage statistics, user demographics (gender, age-range, race and other "custom filters"), real-time personalization based on demographics (and custom filters), security applications for authentication based on face recognition and multi-modal authentication and activity recognition (e.g. detecting predefined activities in given contexts)

A content management team, from the owner of a specific embodiment of the VTE Platform, can decide the content of the modules in the VTE Platform. This issue of content management is highly dependent on the business model of the owner of a specific embodiment of the VTE Platform also. The following FIG. 11 through FIG. 21 show exemplary embodiment of such contents.

FIG. 11 shows a screen shot of the exemplary Module Intro 500 of the VTE Platform. In this module, the owner may use the VTE Platform screen for advertising or announcement.

For the advertisement, videos for one or multiple sponsors may run in a loop 530. Such videos can be placed within any part of the screen or the whole screen. The duration for running an advertisement video can be distinguished depending on the contributions of the sponsors. For example, the title sponsor video can run twice or 3 times longer than other sponsors' video.

Graphical objects, such as the logos of the sponsors, advertisement media 550, or messages 552 may also be displayed on the screen as forms of advertisement or announcement. The main sponsor advertisement media 551 can be distinguished from the general advertisement media 550.

FIG. 12 shows a screen shot of the exemplary Module Attractor 501 of the VTE Platform. The idea behind the Module Attractor 201 is to encourage people to engage in the interaction with the VTE Platform. The Module Attractor 201 can be in any form as long as it grabs people's attention.

In the exemplary embodiment of the Module Attractor 201 shown in FIG. 12, the user's captured face image 553 may be shown on a position of the screen. This idea is based on the fact that people are generally attracted to their reflected images, such as the reflected image in a mirror. The face image can be displayed statically or dynamically. In the case of the dynamic display, the user face image 271 could bounce around in the screen to increase the graphical attraction effect 250. A message 552 in the bottom of the screen may be used to entice the user's active interaction.

Any graphical effects 250, which grab people's attention, are one way of implementing the attraction in the Module Attractor 201. Examples of such graphical effects 250 can be water ripples, bubbles, smoke effect, sparkling effect, digital fireworks, lens effect on the user face's image, twirl effect, cool effects responded by the user body motion, superimposition of virtual objects on to the user's face and body image, augmented reality on the display system 111, or any attractive graphical objects.

Sound effects 251, which grab people's attention, are also another way of implementing the attraction in the Module Attractor 201. Such sound effects 251 can be natural sound, artificial sound, human voice, or any attractive sound. Examples of the natural sound can be bird singing, river flowing sound, and any natural sound which is mellifluous and attractive to people. Examples of the artificial sound can be fire alarm, bell ring, rocket launching sound, and any exciting and shocking sound. Examples of the human voice can be a greeting sound, a calling sound, such as "Hey you in the red shirt!" or any human voice, which grabs people's attention.

The Module Attractor 201 does not have to be implemented only on the screen of the display system 111. The Module Attractor 201 can use external devices to attract the user 400. Examples of such Module Attractor 201 implementation will be light shining on the user 400, moving robotic arm, moving mechanical structure, or any attractive physical objects, which can be controlled by the processing and controlling system 112 of the VTE Platform.

FIG. 13 shows an exemplary Module Training 202 of the VTE Platform with the screen shot of the exemplary Module Training 502 within the display system 111. For those who are not familiar with the VTE Platform, it might be difficult to interact with the system for the first time. To help these people, the Module Training 202 may be used when a person engages in the interaction. The methods for training could be graphical, vocal, or literal.

The graphical training 260 instruction shows how to use the Touch-free Interface in the VTE Platform graphically. In the exemplary embodiment shown in FIG. 13, an idea of 'Virtual Hand Scan' 263 is used to train the user 400 how to move his/her hand remotely. In the exemplary 'Virtual Hand Scan' 263 training application, the VTE Platform asks the user 400 to put his/her hand, which is shown on the display system 111 as a feedback, on the 'Virtual Hand Scan' 263 graphics. If the user 400 follows 404 the instruction and put the hand on the hand scan area, the VTE Platform acknowledges the interaction and finishes the training step after giving the acknowledgement signal to the user 400. If the user 400 does not understand the training instruction and pauses the interaction, additional aid tools can be executed, such as an animation or an instructional video, which shows examples how to follow the training instruction.

The vocal training 261 instruction is played through the sound system 113. The instruction messages can be pre-recorded. The length and number of messages can be engineered depending on the target users. Generally, short and a few number of easy-to-understand messages are preferred.

The literal training 262 instruction, such as training messages, can also be used to display the training instruction. An example of the literal training 262 instruction will be "Move and put your hand on the scanner!" or "Identify yourself on the scanner!"

This Module Training 202 can be skipped if the user 400 selects the skip button 239 as mentioned before, because some people might already know how to use the system.

FIG. 14 shows a screen shot of the exemplary Module Selection 203 of the VTE Platform. The Module Selection 203 is the actual place where the user 400 gets information and entertainment by interacting with the VTE Platform.

The Module Selection 203 is like a container of sub-modules. These sub-modules are selectable by the Touch-free interaction 304 and represented as a form of named selection buttons 231 on the Module Selection 203 screen. The design and content could be in any form depending on the goal of the particular embodiment of the VTE Platform. The Module Selection 203 can be implemented as a monolithic collection of modules or as a hierarchical structure, in which the Module Selection 203 is divided into sub areas, which in turn contain a collection of sub-modules. The number of selection areas could be one or multiple depending on the design ideas of the Module Selection 203 also.

The selection areas may contain selection buttons 231, scroll buttons 230, screen title 554, advertisement media 550, and any appropriate features according to the goal of the particular VTE Platform. In order to show the selection options to the user 400 in a clear manner, the selection buttons 231 on the Module Selection 203 should be easily distinguishable from other features as selectable objects. The selection buttons 231 should also indicate what it links to. For example, the selection buttons 231 can show the names of the corresponding modules they link to on their graphical surface. The selected button leads the user 400 to the next sub-modules, which provides the actual contents as indicated by the button name. The owner or designer of the system will prepare the contents beforehand according to their needs.

In the exemplary embodiment of the Module Selection 203 shown in FIG. 14, the Module Selection 203 is composed of three different selection areas, the Main Selection Area 204, the Information Selection Area 205, and the Entertainment Selection Area 206. Each area contains sub-modules. The selection areas of the Module Selection 203 could have scroll buttons 230, which makes the screen to scroll to the left or to the right if chosen by the Touch-free interaction 304. These scroll buttons 230 are used to expand the physically limited screen space and to move to another selection area among multiple selection areas. Current window area 555 is easily understood by the screen title 554, and this helps the user 400 to know where the user 400 is navigating at the particular moment.

The Main Selection Area 204 may contain selection buttons 231, which lead to the most important contents. It is because the area is the first area, which the user 400 sees, in the Module Selection 203. From this screen the user 400 starts scrolling to other areas. The exemplary sub-modules of the Main Selection Area 204 could contain Module Advertisement 213, Module Announcement 214, or Module Event 215.

The Information Selection Area 205 could contain sub-modules related to providing information contents. The exemplary sub-modules of the Information Selection Area 205 could contain Module Map 210, Module Information 211, Module Company Information 212, Module History, or Module Education.

The Entertainment Selection Area 206 could contain all sub-modules related to the entertainment content. The exemplary sub-modules of the Entertainment Selection Area 206 could contain Module You-In-It 216, Module Game 217, or Module Juke-Box 218.

FIG. 15 shows a screen shot of the exemplary Main Selection Area 503 of the Module Selection 203 of the VTE Platform. In the exemplary embodiment shown in FIG. 15, the Main Selection Area 204 of the Module Selection 203 consists of advertisement media 550, screen title 554, selection buttons 231, and scroll buttons 230.

The advertisement media 550 is used to advertise the owner of the VTE Platform or the sponsor companies. The screen title 554 identifies the user 400 where he is currently among the interaction states and module states. The selection buttons 231 are selectable by the Touch-free interaction 304 as mentioned above. The scroll buttons 230 are selectable by the Touch-free interaction 304 also, and they lead the user 400 to the selected area within the Module Selection 203 areas. In the particular embodiment shown in FIG. 15, the left scroll button leads to the Information Selection Area 205 of the Module Selection 203. The right scroll button leads to the Entertainment Selection Area 206 of the Module Selection 203. Again, the number, the position, and the scheme of the selection areas can be customized depending on the specific application design and the goal of the content management team.

Those exemplary sub-modules in the selection areas of the Module Selection 203 are explained in more details as follows.

FIG. 16 shows a screen shot of the exemplary Module Map 510 of the VTE Platform. Module Map 210 is an example of the sub-modules in the Information Selection Area 205. Map is a representative form of comprehensive information source, and it can be a good exemplary content depending on the specific application. In the exemplary embodiment shown in FIG. 16, the Module Map 210 could contain, the map itself 570, the floor indicator 571, the legend 572, the maneuver area indicator 573, the maneuver buttons 240, the zoom in button 243, the zoom out button 244, the pathfinder button 246, the exit button 234, to upper floor button 241, to lower floor button 242, the designated area direct jump button 245, and the advertisement media 550.

The content management team of the particular embodiment of the VTE Platform provides the digital map 570. The Floor Indicator 571 lets the user 400 know where the person is in the map 570 while navigating through the map 570. This is useful especially for navigating through the multiple maps of a building with multiple floors or a large area with multiple sections.

The exit button 234 and the advertisement media 550 are a few of the exemplary common features, which can be contained in most of the modules in the VTE Platform. The exit button 234 is usually used in order to stop the interaction within the current module and go back to the upper or next module, such as the Module Selection 203 or the modules in the selection areas of the Module Selection 203. The advertisement media 550 in the module screens is used for advertising purpose.

The maneuver area indicator 573 is a graphical tool which response to the user's hand movement in the Touch-free interaction 304. The maneuver area indicator 573 is much more like a mouse pointer in the windows system. Using the maneuver area indicator 573, the user 400 is able to move to the east, to the west, to the north, or to the south within the map 570. When the user 400 points to one of the edges on the map 570 and holds the hand there for a moment, the map 570 can slide to show the section, which is directed by the maneuver area indicator 573 of the hand movement. Another way of enabling the maneuver is to use the maneuver buttons 240 outside the map 570. The maneuver buttons 240, which clearly indicate the directions, can be placed nearby the map 570 and help the user 400 to move around easily. These maneuver buttons 240 could be optional features, since we already have the direct maneuvering method by pointing the edges of the map 570 as mentioned previously.

Using the maneuver area indicator 573, the user 400 is also able to zoom in and out. The map 570 can be divided into sub-sections. When the user 400 points to one of the sub-sections, not the edges of the map 570 but the center of the sub-sections within the map 570, and holds the hand there for a moment, the map 570 can zoom in to the pointed section. The same gesture at the second time can toggle the functionality, and zooms out from the sub-section to a broader section. The optional zoom in button 243 and zoom out button 244 outside the map 570 can also be used as a way of zooming in and out. The sub-sections can be designed in a way, in which they are easily noticeable, such as using different color codes among the sub-sections, and without hindering the original map 570 content.

The pathfinder button 246 can be used to find a shortest path between a start position and an end position within the map 570. In order to designate the start position and the end position, the speech recognition 305 might be fused with the gesture as described in detail by N. Krahnstoever, S. Kettebekov, M. Yeasin, and R. Sharma, "iMap: A Real-Time Framework for Natural Multimodal Interaction with Large Screen Displays," Dept. of Comp. Science and Eng. Technical Report CSE-02-010, Pennsylvania State University, May 2002. For example, the user 400 can say "From here", while pointing a position on the map, then "To here", whiling pointing another position on the map. The fusion of the two modalities can find the starting position and the ending position within the map, and the two positions are used to find the shortest path. Any standard algorithm for finding the shorted distance between the two points, such as the city-block algorithm, can be used for this functionality.

The user 400 is able to go to a different floor when the map 570 consists of the multiple screens of floors by using the 'to upper floor button' 241 and 'to lower floor button' 242. The user 400 is also able to jump to a pre-designated area directly by using the 'pre-designated area direct jump button' 245. This is useful when the user 400 quickly wants to see the pre-designated area. The pre-designated areas are selected depending on the importance of the area and the goal of the content management team of the specific VTE Platform embodiment.

FIG. 17 shows a screen shot of the exemplary Module Information 511 of the VTE Platform. In the exemplary embodiment shown in FIG. 17, the Module Information 211 could contain information display video 531, category selection buttons 232, sub-category selection buttons 233, exit button 234, and advertisement media 550. This Module Information 211 is a generic form of the modules, which provide the information content.

The information display video 531 provides the information as a form of video. However, the information content can be in any form of digital and non-digital material. For example, the information can be provided as a text on a screen, as an audio content, or as a printed material. The category selection buttons 232 and the sub-category selection buttons 233 show that the Module Information 211 can have a hierarchical structure for displaying the information database. For example, selecting a different button in the category selection buttons 232 could display a different set of sub-category selection buttons 233.

The structure of the generic Module Information 211 as in the exemplary embodiment shown in FIG. 17, can be modified to provide other forms of information structure, such as the directory or the catalog. The directory can have a list of item buttons and sub-item buttons in a hierarchical structure. The catalog can also have a list of product buttons and its sub-item buttons in a hierarchical structure.

The content of the generic Module Information 211 as in the exemplary embodiment shown in FIG. 17, can be modified in such a way to provide different content of the information. The Module Company Info will be one example of such modification from the generic Module Information 211. The Module Company Info can be customized to show specific company information content. Any other information content, such as the weather, can be filled in the generic Module Information 211 template. The content of the information widely depends on the goal of the content management team.

FIG. 18 shows a screen shot of the exemplary Module You-In-It 516 of the VTE Platform. The Module You-In-It 216 is an exemplary module, which can be included in the Entertainment Selection Area 206 of the Module Selection 203.

In the exemplary embodiment of the Module You-In-It 216 shown in FIG. 18, a virtual image template 270 is used as a placeholder for the superimposing face image 271. The face image 271 for the You-In-It is processed in real-time. After the users face is detected by the face detection 300, the detected face images 271 in the continuous input images are stored in a list of face images. These face images 271 are superimposed 272 onto the placeholder of the video or picture in real-time, when the user 400 selects this module. The more details of the superimposition technology can be found in R. Sharma and N. Jung, Method and System for Real-time Facial Image Enhancement, U.S. Provisional Patent Application No. 60/394,324, Jul. 8, 2002. The placeholder video or picture is processed offline and loaded at the beginning of the VTE Platform execution.

The examples of the placeholder video or picture can be any interesting and attractive scenery, such as football player, astronauts, and party people. It does not have to be human images. The placeholder image can be animal images, such as monkey images, or any graphical images, which can be replaced by the face images and create interesting look, such as costume images.

FIG. 19 shows a screen shot of the exemplary Module Game 517 of the VTE Platform. The Module Game 217 is an exemplary module, which can be included in the Entertainment Selection Area 206 of the Module Selection 203. The game can be any game, which uses the video display and are played by gesture, such as hand movement or head movement, or speech, such as giving short commands or answering 'Yes' or 'No'.

In the exemplary embodiment of the Module Game 217 shown in FIG. 19, a simple exemplary game is introduced, which could consist of virtual targets 280, virtual ball 281, virtual panel 282, highest scorer face image 283, current player face image 284, highest score 285, current score 286, changes left 287, and game level 288. In the exemplary game, the user 400 can move the virtual panel 282 using the Touch-free interaction 304 interface in the VTE Platform and hit the virtual ball 281 on the screen. The ball destroys the virtual target objects 280 as it hits them. The face image and score of the highest scorer and the current user are shown on the screen. The changes left 287 to the current user and the level 288 of the game are also shown on the screen.

FIG. 20 shows a screen shot of the exemplary Module Juke-Box 518 of the VTE Platform. The Module Juke-Box 218 is an exemplary module, which can be included in the Entertainment Selection Area 206 of the Module Selection 203.

In the exemplary embodiment shown in FIG. 20, the Module Juke-Box 218 consists of the music title 290, the music video 291, the music video list 292, the music selection buttons 235, the play button 236, the pause button 237, and the exit button 234. The user 400 can choose a music video 291 to play within a list 292 of the music videos. The play button 236 and the pause button 237, selectable by the Touch-free Interaction 304, are used for controlling the music video. With the large display system 111, the Module Juke-Box 218 creates an exciting and impressive music experience.

FIG. 21 shows a screen shot of the exemplary Module Survey 519 of the VTE Platform. The Module Survey 219 is an exemplary form of Module Exit 207. It may consist of the screen title 554, the survey question 556, the answer buttons 238, and the captions for the answers 557.

When the user interaction is about to finish or the user 400 wants to finish the interaction, the user 400 can choose to terminate the interaction. From the VTE Platform point of view, this is the step of Module Exit 207. Module Exit 207 can be in any form, which informs the user 400 the end of the interaction. This Module Exit 207 can be designed as an optional step because some people might just want to leave the VTE Platform in the middle of the interaction without following the termination steps. Regardless of going into the Module Exit 207 state, the VTE Platform goes back to the Module Intro 200 state when the interaction is terminated.

There are two ways to collect data about the users in the VTE Platform, an implicit way and an explicit way. The VTE Platform is able to collect the data using the Computer Vision algorithms. This is the implicit way of collecting the data about the user 400, without requiring any user involvement for the data collection. The Module Survey 219 in the exemplary embodiment shown in FIG. 21, is an example for the explicit data collection. The Module Survey 219 can ask the user 400 a series of specific questions and gather demographic data and statistics about the user group, which cannot be gathered by the Computer Vision based technology. The Module Survey 219 stores the answers in a database as useful information to the sponsor or owner of the VTE Platform.

We claim:

1. A method for attracting attention of people in public places and engaging them in an interaction with a system for getting information and entertainment, comprising the following steps of:
   a) executing a wait state module playing multimedia on the system in a wait state when there are no people nearby the system,
   b) executing an attraction state module attracting the people when they appear nearby the system and encouraging them for an engaged interaction with the system by making a transition from the wait state to an attraction state,
   c) executing an user engagement state module helping a user who decided to use the system to learn how to use the system at an user engagement state,
   d) executing an user interaction state module allowing the user to select and use the content of the information and entertainment of the system at an user interaction state, and
   e) executing an user terminations state module finalizing the user interaction at an optional interaction termination state, to which the system can make a transition at the end of the user interaction from the user interaction state,
   wherein the step c) of helping a user at the user engagement state can be skipped if the user does not need the content of the user engagement state,
   wherein the step d) further allows the user to navigate from one content of the information and entertainment to another content of the information and entertainment at the user interaction state and whereby the steps are repeated in a loop by going back to the wait state after the user interaction is terminate at the user interaction state or at the optional interaction termination state, and
   f) executing an image capturing system and a set of computer vision algorithms for user sensing and hand motion sensing; wherein said image-capturing system divides its field of view into a plurality of capture zones, and apply said set of computer vision algorithms within said capture zones to sense said user and said hand motion, and wherein said user is promoted or demoted depending on the coordinate of said user's position in said plurality of capture zones of said image-capturing system.

2. The method according to claim 1, wherein each state comprises a plurality of modules,
   whereby the module is defined as a standalone application or a collection of applications,
   whereby said collection of applications is a container of sub-applications, and
   whereby said collection of applications can also manage the execution of individual sub-applications.

3. The method according to claim 1, wherein the selection of said information and entertainment content is achieved by a touch-free interaction.

4. The method according to claim 3, wherein said touch-free interaction modality is fused with speech recognition input modality to provide multi-modality.

5. The method according to claim 1, wherein said information and entertainment content in a hierarchical structure is delivered by a multimedia display system.

6. The method according to claim 5, wherein said information and entertainment content is updated using a network.

7. The method according to claim 1, wherein said image-capturing system is able to control functionalities, including pan, tilt, zoom, focus, auto-exposure, and white balance, according to the applications of a specific embodiment in order to adapt to the environment and said user's uniqueness.

8. The method according to claim 1, wherein the essentials of a background technology based on the computer vision algorithms further comprises 3-I technologies including: the intelligence technologies, the interaction technologies, and the immersive technologies.

9. The method according to claim 8, wherein said intelligence technologies comprises means for data collection of said user, means for gathering usage statistics, means for getting user demographics, means for processing real-time personalization based on said demographics, means for processing security applications for authentication based on face recognition.

10. The method according to claim 8, wherein said interaction technologies comprises means for face/body detection, means for localization, means for tracking, means for gesture recognition and means for multi-modal integration to facilitate interaction with digital content, and means for appliances for information access and entertainment.

11. The method according to claim 8, wherein said immersive technologies comprises passive immersion, active immersion, and mixed immersion or augmented reality,
  whereby said passive immersion integrates said user's face and body into an application or video, while said user(s) face/body is immersed into selectable background, including group photos in college campus background,
  whereby said active immersion allows said users to control avatars constructed using said user's face image, and
  whereby said mixed immersion or augmented reality allows said users to virtually interact with virtual objects.

12. The method according to claim 1, wherein said wait state further comprises:
  means for playing video loop for advertising purpose and playing content intended to run in an introduction state.

13. The method according to claim 1, wherein said attraction state further comprises:
  means for attracting people and engaging them to the interaction with an embodiment, whereby the means for attracting is an active and intelligent way of interrupting said user by graphical effects, sound effects, or mechanical effects, encouraging said user to engage in the interaction with said method.

14. The method according to claim 1, wherein said user engagement state further comprises:
  means for helping said users to engage in an interaction with an embodiment smoothly by training them to know how to use said embodiment in graphical, vocal, and literal forms.

15. The method according to claim 1, wherein said user interaction state further comprises:
  means for providing said information and entertainment content to said user.

16. The method according to claim 1, wherein said user interaction state further comprises:
  means for providing the interaction not only to a single user but also to a plurality of users.

17. The method according to claim 1, wherein said interaction termination state further comprises:
  means for collecting data about said user,
  whereby the method uses explicit and implicit data collection about said user and stores the result in a database,
  whereby said implicit data collection is done by the computer vision based technologies in the method automatically,
  whereby said data collection method in said interaction termination state is an explicit data collection.

18. A system for attracting attention of people in public places and engaging them in an interaction with a system for getting information and entertainment, comprising the following steps of:
  a) executing a wait state module playing multimedia on the system in a wait state when there are no people nearby the system,
  b) executing an attraction state module attracting the people when they appear nearby the system and encouraging them for an engaged interaction with the system by making a transition from the wait state to an attraction state,
  c) executing an user engagement state module helping a user who decided to use the system to learn how to use the system at an user engagement state,
  d) executing an user interaction state module allowing the user to select and use the content of the information and entertainment of the system at an user interaction state, and
  e) executing an user terminations state module finalizing the user interaction at an optional interaction termination state, to which the system can make a transition at the end of the user interaction from the user interaction state,
  wherein the step c) of helping a user at the user engagement state can be skipped if the user does not need the content of the user engagement state,
  wherein the step d) further allows the user to navigate from one content of the information and entertainment to another content of the information and entertainment at the user interaction state and whereby the steps are repeated in a loop by going back to the wait state after the user interaction is terminate at the user interaction state or at the optional interaction termination state, and
  f) executing an image capturing system and a set of computer vision algorithms for user sensing and hand motion sensing; wherein said image-capturing system divides its field of view into a plurality of capture zones, and apply said set of computer vision algorithms within said capture zones to sense said user and said hand motion, and wherein said user is promoted or demoted depending on the coordinate of said user's position in said plurality of capture zones of said image-capturing system.

19. The system according to claim 18, wherein said wait state further comprises:
 means for playing video loop for advertising purpose and playing content intended to run in an introduction state.

20. The apparatus according to claim 18, wherein said attraction state further comprises:
 means for attracting people and engaging them to the interaction with an embodiment, whereby the means for attracting is an active and intelligent way of interrupting said user by graphical effects, sound effects, or mechanical effects, encouraging said user to engage in the interaction with said method.

21. The apparatus according to claim 18, wherein said user engagement state further comprises:
 means for helping said users to engage in an interaction with an embodiment smoothly by training them to know how to use said embodiment in graphical, vocal, and literal forms.

22. The system according to claim 18, wherein said user interaction state further comprises:
 means for providing said information and entertainment content to said user.

23. The apparatus according to claim 18, wherein said user interaction state further comprises:
 means for providing the interaction not only to a single user but also to a plurality of users.

24. The system according to claim 18, wherein said interaction termination state further comprises:
 means for collecting data about said user,
 wherein the system uses explicit and implicit data collection about said user and stores the result in a database,
 wherein said implicit data collection is done by said computer vision algorithms in the system automatically,
 wherein a data collection method in said interaction termination state is an explicit data collection.

* * * * *